(12) United States Patent
Endo

(10) Patent No.: US 7,430,613 B2
(45) Date of Patent: Sep. 30, 2008

(54) IMAGE COMMUNICATION APPARATUS, IMAGE COMMUNICATION SYSTEM AND IMAGE COMMUNICATION METHOD

(75) Inventor: Hiroshi Endo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 387 days.

(21) Appl. No.: 09/875,075

(22) Filed: Jun. 6, 2001

(65) Prior Publication Data

US 2002/0002623 A1    Jan. 3, 2002

(30) Foreign Application Priority Data

Jun. 29, 2000  (JP)  ............... 2000-196215
Apr. 26, 2001  (JP)  ............... 2001-128964

(51) Int. Cl.
*G06F 15/16* (2006.01)
(52) U.S. Cl. ............ 709/245; 709/218; 709/220; 709/225; 709/226; 709/249; 379/88.13; 379/88.17
(58) Field of Classification Search ........... 358/1.15; 370/401; 709/206; 379/100.01–100.17
See application file for complete search history.

(56) References Cited

U.S. PATENT DOCUMENTS

| | | | | |
|---|---|---|---|---|
| 5,014,300 A * | 5/1991 | Harvath et al. | ......... | 379/100.09 |
| 5,241,589 A * | 8/1993 | Jefferson | ............... | 379/355.01 |
| 5,675,638 A * | 10/1997 | Ogasawara et al. | .... | 379/221.09 |
| 5,872,845 A * | 2/1999 | Feder | ................... | 379/100.12 |
| 6,014,379 A * | 1/2000 | White et al. | ........... | 379/100.15 |
| 6,020,980 A * | 2/2000 | Freeman | ................ | 379/100.13 |
| 6,215,790 B1 * | 4/2001 | Voit et al. | ................... | 370/401 |
| 6,363,065 B1 * | 3/2002 | Thornton et al. | ....... | 379/221.01 |
| 6,456,625 B1 * | 9/2002 | Itoi | ............... | 370/401 |
| 6,463,051 B1 * | 10/2002 | Ford | ........................ | 370/352 |
| 6,539,077 B1 * | 3/2003 | Ranalli et al. | ............. | 379/67.1 |
| 6,545,768 B1 * | 4/2003 | Matsubara et al. | ......... | 358/1.15 |
| 6,584,098 B1 * | 6/2003 | Dutnall | ........................ | 370/354 |
| 6,587,684 B1 * | 7/2003 | Hsu et al. | .................... | 455/419 |
| 6,643,291 B1 * | 11/2003 | Yoshihara et al. | ........ | 379/395.5 |
| 6,674,541 B1 * | 1/2004 | Kamiyama et al. | ..... | 379/100.09 |
| 6,690,480 B2 * | 2/2004 | Maeda | ...................... | 358/1.15 |
| 6,760,322 B1 * | 7/2004 | Fukuda et al. | .............. | 370/352 |
| 6,775,369 B1 * | 8/2004 | McClung | ............... | 379/211.04 |
| 6,801,546 B1 * | 10/2004 | Yoshida et al. | ......... | 379/100.08 |
| 6,807,166 B1 * | 10/2004 | Ohura | ........................ | 370/352 |
| 6,822,957 B1 * | 11/2004 | Schuster et al. | ............ | 370/389 |
| 6,847,634 B1 * | 1/2005 | Pearce et al. | ................ | 370/352 |

(Continued)

*Primary Examiner*—Bunjob Jaroenchonwanit
*Assistant Examiner*—Dohm Chankong
(74) *Attorney, Agent, or Firm*—Panitch Schwarze Belisario & Nadel LLP

(57) ABSTRACT

An image communication apparatus is provided which is capable of transmitting images using network addresses corresponding to telephone numbers derived from a plurality of telephone systems.

The image communication apparatus for use in the image communication network system containing a computer network, inside telephone network, outside telephone network, first address supplying device to store correspondence between inside numbers and network addresses and a second address supplying device to store correspondence between outside telephone numbers and network addresses, is provided with a judging section to judge whether an input telephone of another facsimile can be used, an address receiving section receives network addresses corresponding to input telephone numbers from either of both address supplying devices based on judgment of the judging section and an image transmitting section to transmit images through computer networks to the another image communication apparatus based on network addresses.

21 Claims, 13 Drawing Sheets

U.S. PATENT DOCUMENTS

| | | | |
|---|---|---|---|
| 6,856,614 B1 * | 2/2005 | Sun | 370/352 |
| 6,956,848 B1 * | 10/2005 | Keung et al. | 370/356 |
| 6,973,169 B1 * | 12/2005 | Lukin | 379/93.07 |
| 6,990,094 B1 * | 1/2006 | O'Neal et al. | 370/352 |
| 7,050,426 B2 * | 5/2006 | Veschi | 370/356 |
| 7,061,901 B1 * | 6/2006 | Shnitzer et al. | 370/352 |
| 7,145,899 B1 * | 12/2006 | Pearce et al. | 370/352 |
| 2003/0039237 A1 * | 2/2003 | Forslow | 370/352 |

* cited by examiner

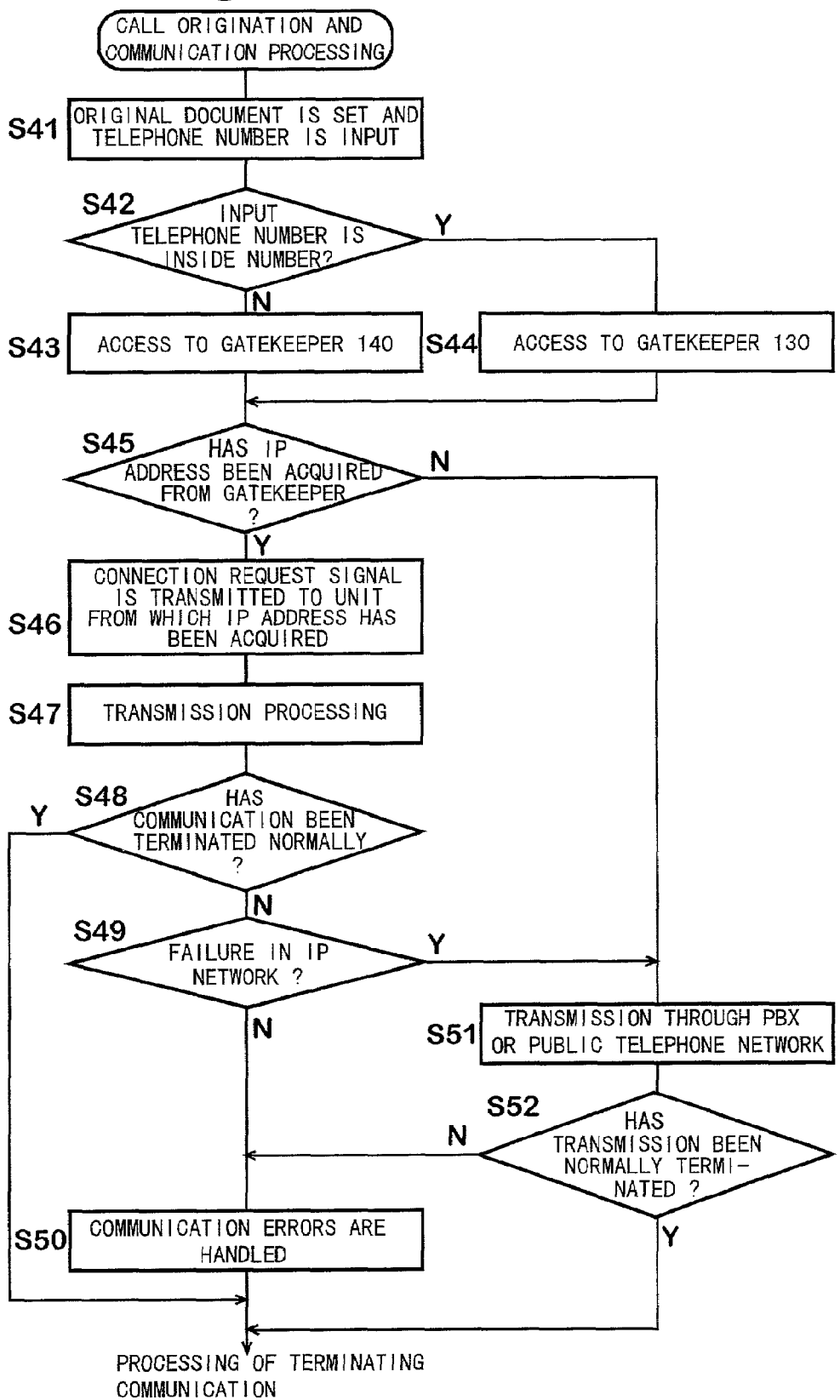

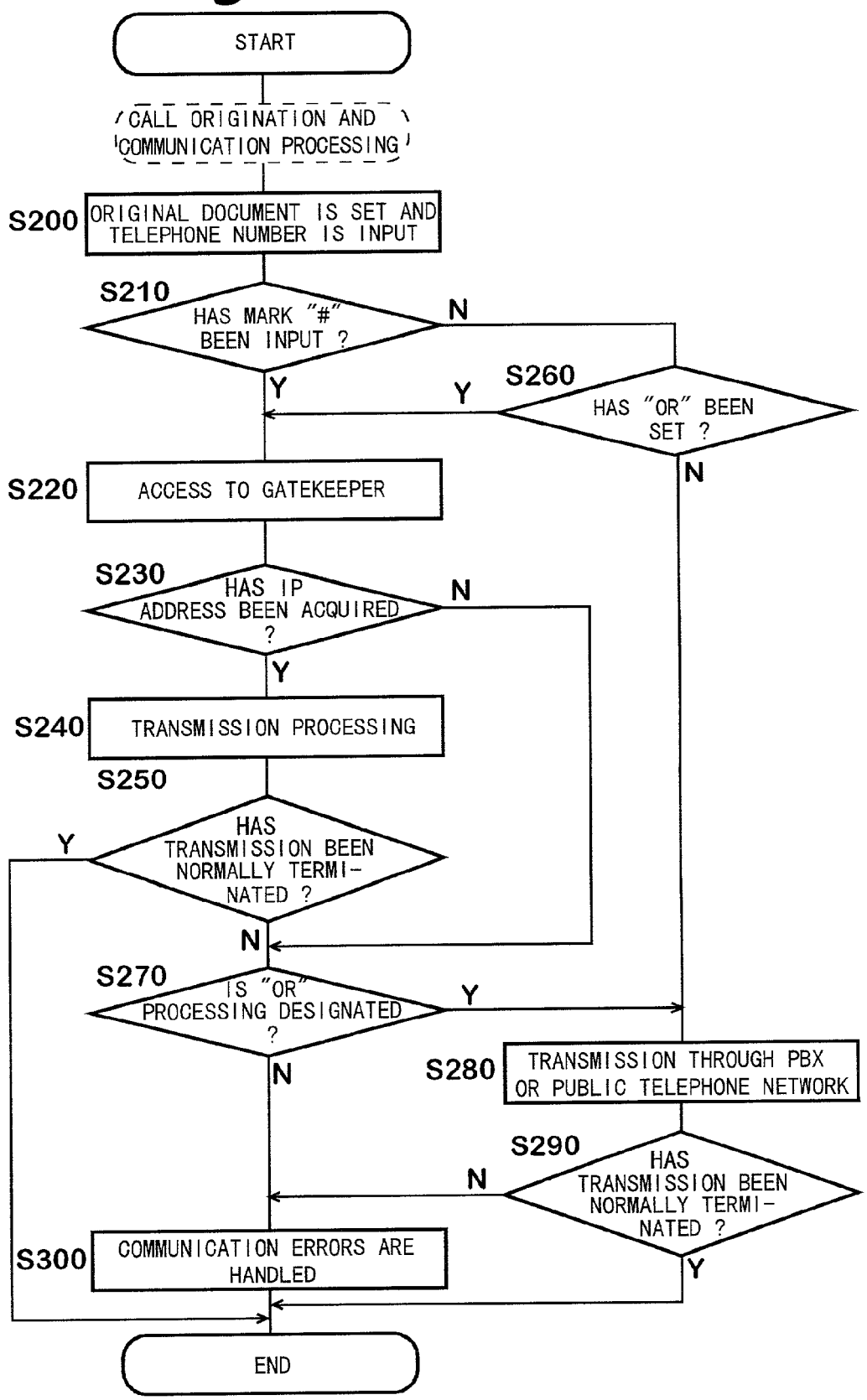

IMAGE COMMUNICATION APPARATUS, IMAGE COMMUNICATION SYSTEM AND IMAGE COMMUNICATION METHOD

BACKGROUND OF THE INVENTION

1. Field of the Invention

The present invention relates to an image communication apparatus, an image communication system incorporating the image communication apparatus and an image communication method for use in the above image communication apparatus or in the above image communication system and more particularly to the image communication apparatus, image communication system and image communication method that can be suitably employed in image communication through an IP (Internet Protocol) network.

2. Description of the Related Art

In conventional image communication systems, after an image communication apparatus to which an image is to be transmitted is designated by, for example, a telephone number of a facsimile serving as the image communication apparatus to which the image is to be transmitted, the image is transmitted through a telephone network to the designated facsimile. In recent years, in addition to transmission and receipt of images through the telephone network, the transmission and receipt of images through a computer network by designating an image communication apparatus to which the image is to be transmitted using a network address on a computer network such as the Internet and/or intranet are becoming widespread.

The above conventional image communication system is provided with a gatekeeper which enables an image communication apparatus on a sender side to acquire a network address assigned to an image communication apparatus on a receiver side. The gatekeeper is adapted to store correspondence between the telephone number and the network address and, in response to an inquiry from the image communication apparatus on the sender side, to notify the image communication apparatus on the sender side of the network address of the image communication apparatus on the receiver side.

However, according to the ITU-T (International Telecommunication Union-Telecommunication) Recommendation H.323, all that the gatekeeper can do is to store only one sort of correspondence between a telephone number and a network address or between a plurality of telephone numbers and a plurality of network addresses, that is, is prohibited from storing a plurality of sorts of correspondences, to provide the network address corresponding to an inquired telephone number according to the above correspondence. Therefore, for example, either of an outside telephone number or an inside telephone number can be used in a fixed manner, however, it is impossible to selectively use both the outside and inside telephone numbers in order to acquire the network address common thereto.

SUMMARY OF THE INVENTION

In view of the above, it is an object of the present invention to provide an image communication apparatus, image communication system and image communication method which are capable of transmitting images by using network addresses corresponding to telephone numbers derived from a plurality of telephone systems.

According to a first aspect of the present invention, there is provided an image communication apparatus for use in an image communication network system including a computer network being able to transmit and receive an image, based on a network address, a first telephone network being able to transmit and receive the image based on a first telephone number, a second telephone network being able to transmit and receive the image based on a second telephone number, a first address supplying device connected to the computer network adapted to store correspondence between the first telephone number and the network address corresponding to the first telephone number, and a second address supplying device connected to the computer network adapted to store correspondence between the second telephone number and the network address corresponding to the second telephone number, including:

an input section to input either of the first telephone number or the second telephone number provided to another image communication apparatus to which the image is to be transmitted;

a judging section to judge whether the telephone number input through the input section is able to be used;

a number transmitting section to transmit the input telephone number, based on a judgement result by the judging section, to either of the first address supplying device or the second address supplying device;

an address receiving section to receive, in response to the telephone number fed from the telephone number transmitting section, a network address corresponding to the telephone number; and an image transmitting section to transmit, based on the network address received by the address receiving section, the image to the another image communication apparatus through the computer network.

In the foregoing, a preferable mode is one wherein the judging section judges whether the input telephone number has been registered.

Also, a preferable mode is one wherein the judging section judges whether the input telephone number is the first telephone number or the second telephone number.

Also, a preferable mode is one wherein the image communication apparatus is provided with the first address supplying device and the second address supplying as function sections of the image communication apparatus.

Also, a preferable mode is one that wherein includes a second image transmitting section to transmit images to the another image communication apparatus through either of the telephone network for use in the first telephone number or the telephone network for use in second telephone number.

Also, a preferable mode is one that wherein includes a signal receiving section to receive, when the second image transmitting section transmits a first image, using either of the first telephone number or the second telephone number, to the another image communication apparatus through either of the telephone network for use in the first telephone number or the telephone network for use in second telephone number, a signal containing a computer address provided to the image communication apparatus on a receiver side which is returned, in response to the transmitting of the image, from the another image communication apparatus and wherein the first image transmitting section is adapted to transmit a second image contained in the signal received by the signal receiving section, based on the computer address of the another image communication apparatus, to the another image communication apparatus through the computer network.

Also, a preferable mode is one that wherein includes a storage section to store correspondence between the telephone number used by the image transmitting section when the first image is transmitted and received through either of the telephone network for use in the first telephone number or the telephone network for use in the second telephone number and the network address of the another image communication apparatus received by the signal receiving section when the first image is received.

Also, a preferable mode is one wherein the second image transmitting section, when the first image transmitting section fails to transmit the image based on the computer address through the computer network, transmits the image using either of the first telephone number or the second telephone number through either of the telephone network for use in the first telephone number or the telephone network for use in the second telephone number.

Also, a preferable mode is one that wherein includes an operation section to designate to which priority is given, transmission by the first image transmitting section through the computer network or transmission by the second image transmitting section through the telephone network.

Also, a preferable mode is one wherein the operation section, when the first image transmitting section fails to transmit the image through the computer network, designates whether the image is to be transmitted by the second image transmitting section through the telephone network.

Also, a preferable mode is one wherein the first telephone network is an inside telephone network that is able to transmit and receive the image based on the first telephone number being the inside telephone number and the second telephone network is an outside telephone network that is able to transmit and receive the image based on the second telephone number being the outside telephone number and wherein the computer network is either of an intranet or the Internet that is able to transmit and receive the image based on the network address being an IP (Internet Protocol) address.

Also, a preferable mode is one wherein the number transmitting section transmits the input number through the computer network and the address receiving section receives the network address through the computer network.

According to a second aspect of the present invention, there is provided an image communication system including:
a computer network being able to transmit and receive an image based on a network address;
a first telephone network being able to transmit and receive the image based on a first telephone number;
a second telephone network being able to transmit and receive the image based on a second telephone number;
a first address supplying device connected to the computer network adapted to store correspondence between the first telephone number and the network address corresponding to the first telephone number;
a second address supplying device connected to the computer network adapted to store correspondence between the second telephone number and the network address corresponding to the second telephone number;
a plurality of image communication apparatuses to send and receive the image mutually through any one of the computer network, first telephone network and second telephone network; and
wherein each of a plurality of the image communication apparatuses includes an input section to input either of the first telephone number or the second telephone number provided to another image communication apparatus to which the image is to be transmitted, a judging section to judge whether the telephone number input through the input section is able to be used, a number transmitting section to transmit the input telephone number, based on a judgement result by the judging section, to either of the first address supplying device or the second address supplying device, an address receiving section to receive, in response to the telephone number fed from the telephone number transmitting section, a network address corresponding to the telephone number; and an image transmitting section to transmit, based on the network address received by the address receiving section, the image to the another image communication apparatus through the computer network.

In the foregoing, a preferable mode is one wherein the judging section judges whether the input number has been registered.

Also, a preferable mode is one wherein the judging section judges whether the input number is the first telephone number or the second telephone number.

Also, a preferable mode is one wherein the image communication system is provided with, as its function section, either of the first address supplying device or the second address supplying device.

Also, a preferable mode is one wherein the image communication apparatus further includes an operation section to designate either of the image communication apparatus having either of the first address supplying device or the second address supplying device as a device from which the network address is acquired.

Also, a preferable mode is one wherein the number transmitting section transmits the input number through the computer network and wherein the address receiving section receives the network address through the computer network.

According to a third aspect of the present invention, there is provided an image communication method including for carrying out image communication with another image communication apparatus, based on a computer address, through a computer network, including:
a step of receiving a telephone number of the another image communication apparatus;
a step of judging whether the received telephone number is a first telephone number or a second telephone number;
a step of acquiring a computer address corresponding to the first telephone number, when the telephone number is judged to be the first telephone number, by referring to a first table showing correspondence between the first telephone number and the computer address;
a step of acquiring a computer address corresponding to the second telephone number, when the telephone number is judged to be the second telephone number, by referring to a second table showing correspondence between the second telephone number and the computer address; and
a step of transmitting the image to the another communication apparatus based on the acquired computer address.

In the foregoing, a preferable mode is one that wherein includes:
a second transmitting step of transmitting the image to the another image communication apparatus, based on the first telephone number, through a first telephone network and a second telephone network; and
a step of selectively performing either of the first transmitting step and the second transmitting step.

Also, a preferable mode is one wherein, in the step of selectively performing either of the first transmitting step and the second transmitting step, priority is given to the first transmitting step rather than to the second transmitting step.

Also, a preferable mode is one wherein, in the step of selectively performing either of the first transmitting step and the second transmitting step, when a failure occurs in the first transmitting step, the second transmitting step is performed.

Furthermore, a preferable mode is one that wherein includes:
a step of receiving a signal which is to be received from the another image communication apparatus through either of the first telephone network or the second telephone network and which contains a computer address of the another image communication apparatus;

a step of extracting a computer address of the another image communication apparatus from the received signal; and wherein the first transmitting step is used to transmit the image, based on the extracted computer address, through the computer network to the another image communication apparatus.

BRIEF DESCRIPTION OF THE DRAWINGS

The above and other objects, advantages and features of the present invention will be more apparent from the following description taken in conjunction with the accompanying drawings in which:

FIG. 12 is a flowchart explaining operations of the network system using the image communication apparatus according to the fifth embodiment of the present invention; and FIG. 13 is a flowchart explaining operations of the network system using the image communication apparatus according to a sixth embodiment of the present invention.

DESCRIPTION OF THE PREFERRED EMBODIMENTS

Figure 1:
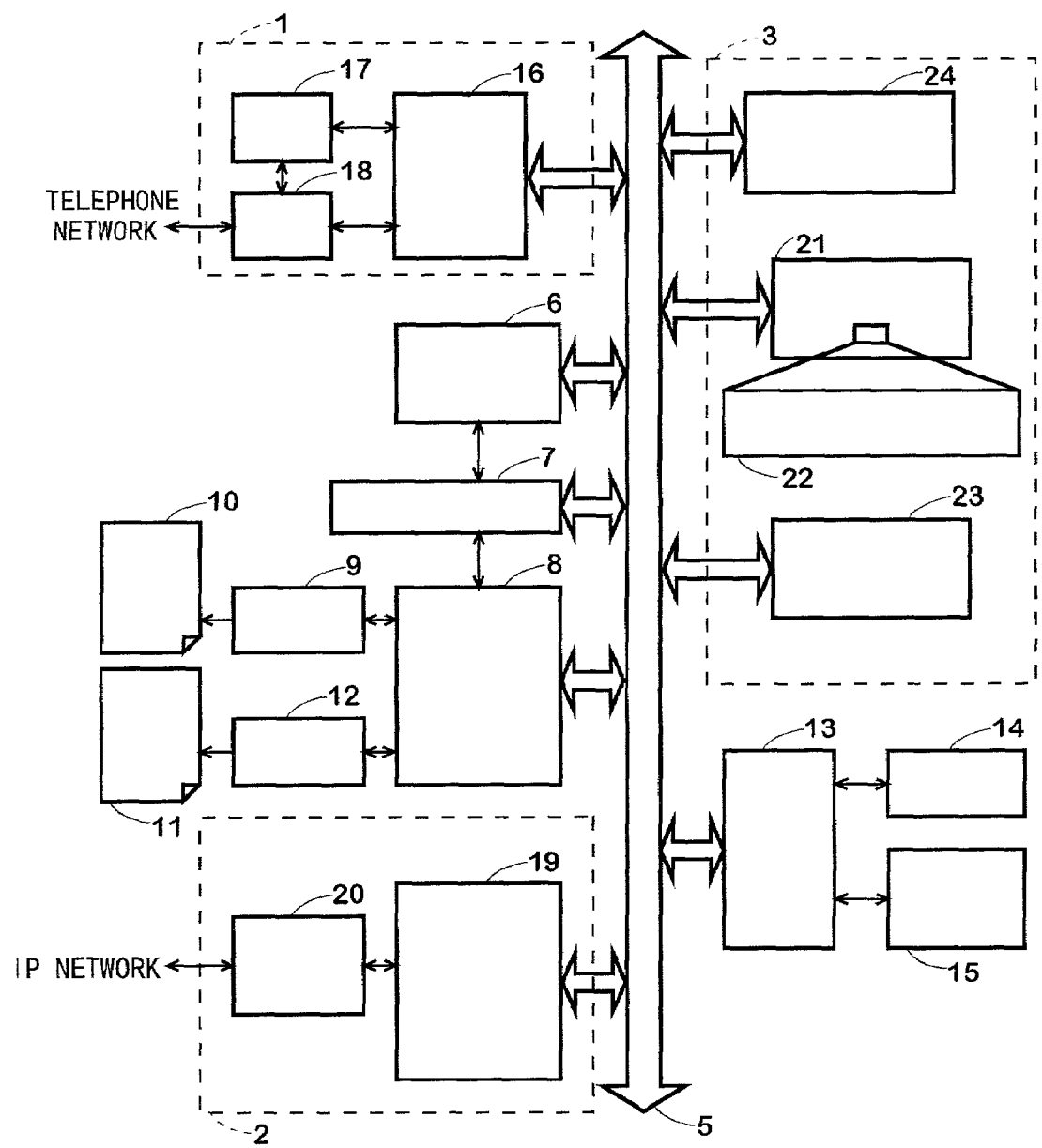
FIG. 1 is a schematic block diagram showing configurations of an image communication apparatus according to a first embodiment of the present invention.

Best modes of carrying out the present invention will be described in further detail using various embodiments with reference to the accompanying drawings.

First Embodiment

An image communication apparatus of a first embodiment of the present invention will be explained by referring to FIG. 1. In the image communication apparatus of the first embodiment, an image is transmitted to the image communication apparatus to which the image is to be transmitted through either of a telephone network including inside and outside telephone networks or an IP network being a computer network. The image communication apparatus 1000 of the first embodiment includes a telephone network connecting unit 1, an IP network connecting unit 2, a communication connection controlling unit 3, an address data bus 5, an image information compressing and decompressing section 6, a line memory 7, an image processing section 8, a printer 9, a scanner 12, an interface 13, a mechanism controlling section 14 and an operating and displaying section 15.

The telephone network connecting unit 1 has a modem NCU (Network Control Unit) interface 16, a modem 17 and an NCU 18, which are all used to transmit and/or receive an image signal to and from another image communication apparatus (for example, a facsimile). The modem NCU interface 16 is used to establish connection among the address data bus 5, modem 17 and NCU 18 to transmit address information. The modem 17 performs functions designated by ITU-T Recommendations V.17 and V.34. The NCU 18 carries out processing of connection with the telephone network.

The IP network connecting unit 2, which functions as a number transmitting section, address receiving section and image sending section, has a LAN interface section 19 and an LCU (LAN Control Unit) 20 to transmit and/or receive an image signal from and to the other image communication apparatus through the IP network and to transmit and/or receive a signal from and to the gatekeeper which functions as an address supplying device, that is, to send a telephone number to the gatekeeper and to receive an IP address from the gatekeeper. The LAN interface 19 is used to connect the address data bus 5 with the LCU 20. The LCU 20 performs processing of connection to the IP network.

The communication connection controlling unit 3 having an address acquisition section 21, a RAM (Random Access Memory) 23 and CPU 24 is operated to control the above telephone network connecting unit 1 and the above IP network connecting unit 2 so as to connect a line to the other image communication apparatus.

The address acquisition section 21 is a storage section adapted to store a procedure for retrieving an IP address of the other image communication apparatus, by accessing, based on a telephone number of the other image communication apparatus, a gatekeeper (described later) to manage the telephone number and the IP address assigned to the other image communication apparatus, which includes, for example, a ROM (Read Only Memory). The address acquisition section 21 includes a gatekeeper identifying section 22, which is a section adapted to identify, for example, an inside telephone number or an outside telephone number each being derived from different telephone systems. The gatekeeper identifying section 22 functions as the judging section, that is, it recognizes a telephone number as the number for the outside telephone line, for example, if its first number is "0" (zero) and also recognizes a telephone number as the number for the inside telephone number, for example, if the number of digits of the telephone numbers is four.

The CPU 24 retrieves the IP address of the other image communication apparatus by accessing the gatekeeper in accordance with retrieving procedures stored in the address acquisition section 21 and connects the line to the other image communication apparatus through the IP network based on the IP address.

The image information compressing and decompressing section 6, when transmitting information, compresses image data to be transmitted and, when receiving information, decompresses the received compressed image data. The line memory 7 stores image data to be transmitted or image data to be received. The image processing section 8, which is connected to a scanner 12 and a printer 9, processes image data read by the scanner 12 and to be transmitted to the other image communication apparatus, and also processes image data received from the image communication apparatus of the other image communication apparatus and to be transmitted to the printer 9. The printer 9 receives image data from the image processing section 8 and reproduces it on printing paper 10. The scanner 12 reads an image from a sending original document and converts it into image data.

The interface 13, which functions as an input section, connects the mechanism control section 14 and the operating and displaying section 15 to the address data bus 5. The operating and displaying section 15 notifies the CPU 24 of an instruction to transmit an image input by an operator and displays an operation state of the image communication apparatus 1000 on an operator display.

Next, the image communication system containing the described image communication apparatus 1000 is described.

Figure 2:
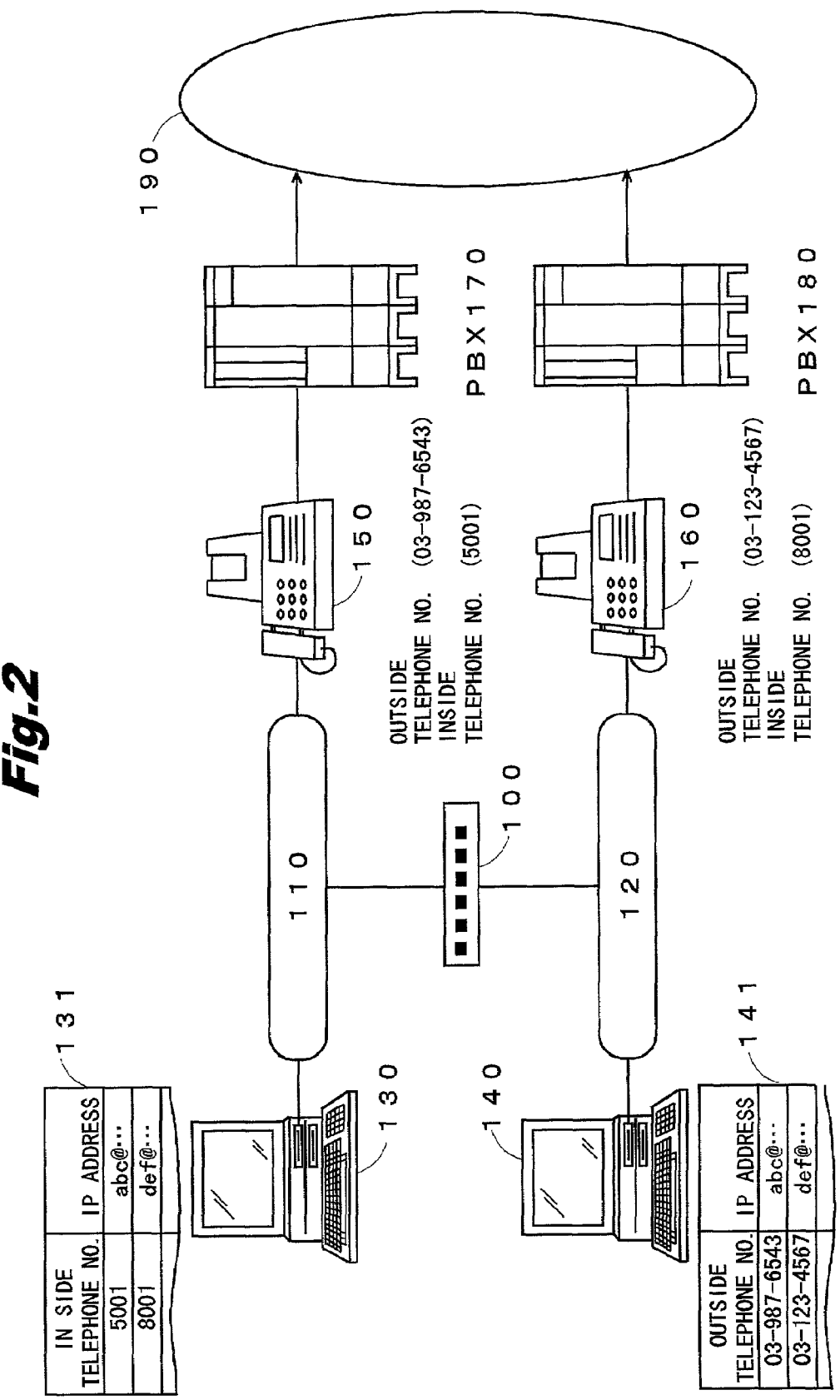
FIG. 2 is a schematic block diagram showing configurations of a network system using the image communication apparatus according to the first embodiment of the present invention.

FIG. 2 is a schematic block diagram showing configurations of the network system using the image communication apparatus according to the first embodiment. The image communication system of the first embodiment is made up of, for example, IP networks 110 and 120 being connected to each other through a router 100.

To the IP network are connected a gatekeeper 130 and a facsimile 150. Moreover, the facsimile 150 is connected to a public network line 190 through a PBX (private branch exchange) 170. To the IP network 120 are connected the gatekeeper 140 and the facsimile 160. The facsimile 160 is connected to the public network line 190 through the PBX 180.

Here, the facsimile 150 (having the outline telephone number, for example, 03-987-6543 and the inside telephone numbers, for example, 5001) and the facsimile 160 (having the outline telephone number, for example, 03-123-4567 and the inside telephone number, for example, 8001) are the image communication apparatuses shown in FIG. 1.

The gatekeeper 130, since it functions as the gatekeeper for use in the inside telephone line, receives, information required for registration of the facsimiles 150 and 160, including, for example, the inside telephone number and the IP address, from the facsimiles 150 and 160. More particularly, the gatekeeper 130, as shown in FIG. 2, stores a conversion table 131 showing a correspondence relation between the inside number and the IP address. FIG. 2 shows an example in which the inside telephone number 5001 of the facsimile 150 corresponds to "abc@. . ." of the IP address.

The gatekeeper 140, since it functions as the gatekeeper for use in the outside telephone line, receives information required for registration of the outside telephone number of the facsimiles 150 and 160, for example, the outside telephone number and IP address, from the facsimile 150 and 160. More particularly, the gatekeeper 140, as shown in FIG. 2, stores a conversion table 141 showing the correspondence between the outside telephone number and the IP address. FIG. 2 shows an example in which the outside telephone number 03-987-6543 of the facsimile 150 corresponds to "abc@. . ." of the IP address.

Next, image receiving and transmitting operations of the image communication apparatus of the first embodiment will be described below. The image communication apparatus of the first embodiment performs two types of image data transmitting operations including the operation (1) of performing transmission of image data through the telephone network and the operation (2) through the IP network. The image communication apparatus of the first embodiment performs two types of image data receiving operations including operations (3) of performing a receipt of image data through the telephone network and operations (4) through the IP network.

The operation (1) of transmitting image data by the telephone network connecting unit 1 through the telephone network will be described below.

The scanner 12 reads image data on the sending original document 11. The read image data, after being image-processed in the image processing section 8, is stored in the line memory 7 for a time. Then, the image data is read from the line memory 7 by the image information compressing and decompressing section 6 and then is compressed and is stored in the RAM 23 through the address data bus 5. The RAM 23 acts as a transmitting buffer. Then, image data is transferred to a modem NCU interface 16 through the address data bus 5 and is modulated by the modem and is sent out from an NCU 18 to the telephone network.

Next, the operation (2) of transmitting image data by the IP network connecting unit 2 through the IP network will be described below.

The scanner 12 reads image data on the sending original document 11 in the same manner as above. The read image data, after being image-processed by the image processing section 8, is stored in the line memory 7. Then, the image data is read from the line memory 7 by the image information compressing and decompressing section 6 and is compressed and then is stored in the RAM 3 through the address data bus 5. Unlike the above case, the image data is converted into packet data by the LAN interface section 19 and is sent out through an LCU (LAN Control Unit) 20 to the IP network.

Next, the operation (3) of receiving image data by the telephone network connecting unit 1 through the telephone network will be described below.

The image data received through the telephone network passes through the NCU 18 and is demodulated by the modem 17. The image data is transferred through the modem NCU interface 16 and data bus 5 and is stored in the RAM 23. Here, the RAM 23 acts as the image data receiving buffer. Then, the image data is decompressed by the image information compressing and decompressing section 6 and is transmitted to the printer 9 through the line memory 7 and the image processing section 8. The image data is reproduced by the printer 9 on the recording paper 10.

Next, the operation (4) of receiving image data by the IP network connecting unit 2 through the telephone network will be described below.

The image data is received through the IP network. The image data is transferred through the LCU 20, LAN interface section 19 and address data bus 5 to the RAM 23 where it is stored. In the same manner as above, the image data is decompressed by the image information compressing and decompressing section 6 and is transferred through the line memory 7 and image processing section 8 to the printer 9. The image data is reproduced by the printer 9 on recording paper 10.

Moreover, the above transmitting operation (1) through the telephone network is performed in accordance with the ITU-T Recommendation T. 30. The information about communication procedures for the transmitting operation is transmitted by the CPU 24 through the data bus 5 to the modem NCU interface 16 and then to the modem 17. The image data is modulated by the modem 17 and is sent out through the NCU to the telephone network. In the other image communication apparatus having the same configurations as that shown in FIG. 1, the information about the communication procedures transmitted through the telephone network is sent through the NCU 18 to the modem 17 and then demodulated by the modem 17 and is transmitted through the modem NCU interface 16 and the data bus 5 to the CPU 24.

On the other hand, the above transmitting operation (2) through the IP network is performed in accordance with the ITU-T Recommendation T. 38. The information about communication procedures for transmitting operations is transmitted by the CPU 24 through the data bus 5 to the LAN interface 19. The image data is converted into packet data and sent out through the LCU 20 to the IP line. Moreover, in the other image communication apparatus having the same configuration as that shown in FIG. 1, the information about the above communication procedures transmitted from the IP network is transmitted through the LCU 20, LAN interface section 19 and data bus 5 to the CPU 24.

Next, operations of communication in the network system configured by using the image communication apparatus described above are described.

Figure 3:
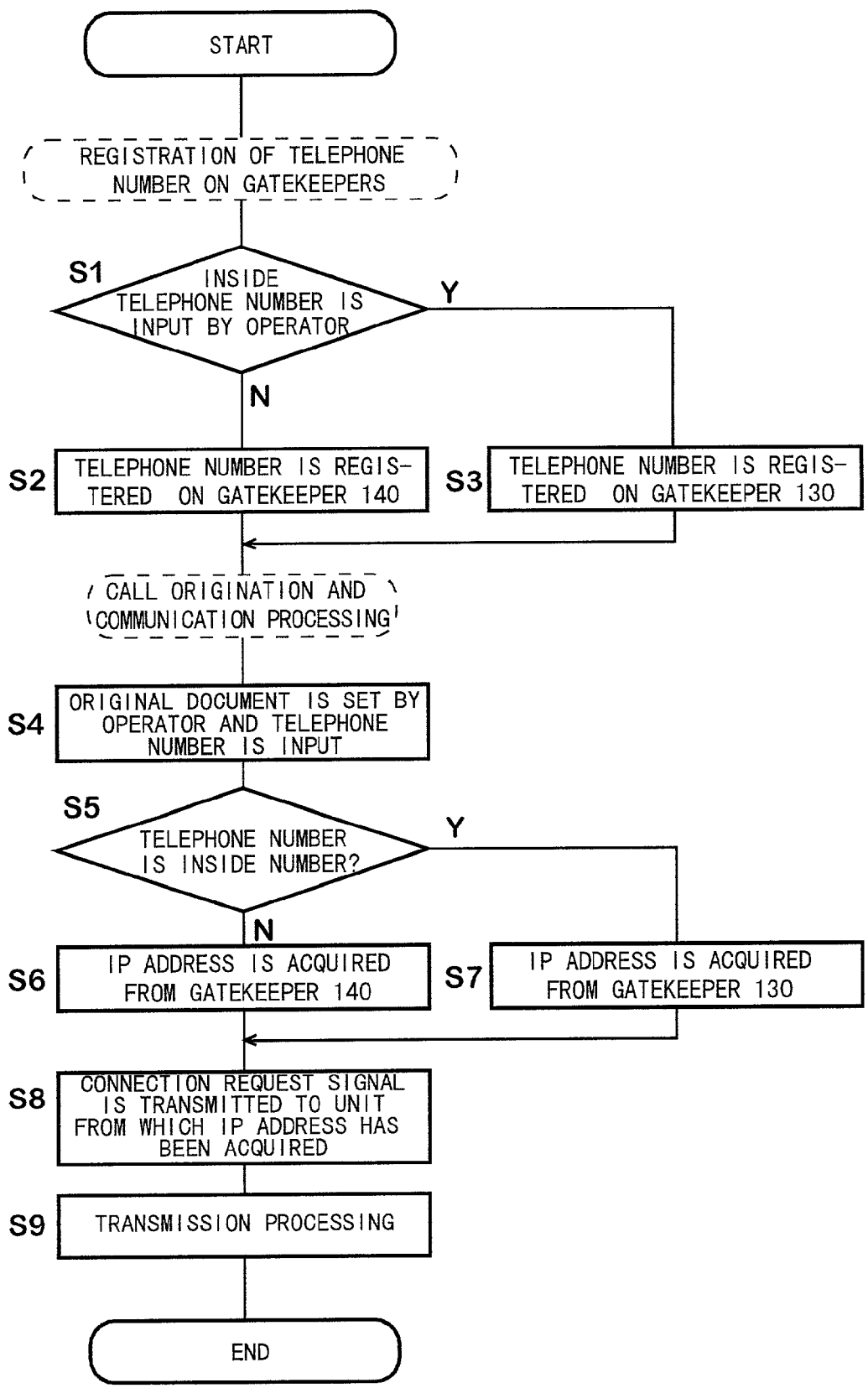
FIG. 3 is a flowchart explaining operations of the network system using the image communication apparatus according to the first embodiment of the present invention.

FIG. 3 is a flowchart explaining operations of the network system using the image communication apparatus according to the first embodiment. In the example, let it be assumed that the image communication apparatus has telephone numbers derived from two telephone line systems including the inside and outside telephone numbers.

For easy description and understanding of operations, let it be also assumed that an image is transmitted from the facsimile 150 to the facsimile 160.

Registration of a telephone number on the gatekeeper will be described by referring to FIG. 3.

Step S1: When an operator, by manipulating the operating and displaying section 15, inputs the inside or outside telephone number of the facsimiles 150 and 160 to these facsimiles 150 and 160, these facsimiles 150 and 160 judges whether the input telephone number is the inside telephone number or outside telephone number.

Step S2: The facsimiles 150 and 160, when having judged that the input telephone number is, for example, the outside telephone number, registers the outside telephone number on the gatekeeper 140.

Step S3: The facsimiles 150 and 160, when having judged that the input telephone number is, for example, the inside telephone number, registers the inside telephone number on the gatekeeper 130.

Next, call origination and communication will be described by referring to FIG. 1 and FIG. 2.

Step S4: The operator sets a sending original document on the facsimile 150 and inputs the outside telephone number (for example, 03-123-4567) of the facsimile 160.

Step S5: The gatekeeper identifying section 22 of the communication connection controlling section 3 in the facsimile 150 judges whether the input telephone number is the inside telephone number or the outside telephone number.

Step S6: The gatekeeper identifying section 22, since a head number of the input telephone number is 0 (zero) which indicates one of the outside telephone number, judges that the input telephone number is the outside telephone number. Therefore, the communication connection controlling unit 3 recognizes that an access has to be made to the gatekeeper 140 for the outside telephone line. As a result, the IP network unit 2 accesses the gatekeeper 140 for the outside telephone line and, based on the conversion table 141 provided in the gatekeeper 140, acquires the IP address.

Moreover, the communication connection controlling unit 3 accesses the gatekeeper 140 through the IP network 110, router 100 and IP network 120 and acquires the IP address of the other facsimile 160.

Step S7: When the inside telephone number (8001) is input, since the head of the input telephone number is 8 (eight) which indicates one of the inside telephone numbers, the gatekeeper identifying section 22 judges that the telephone number is the inside telephone number. Thus, the communication connection controlling unit 3 accesses the gatekeeper 130 for the inside telephone line and, based on the conversion table 131 provided in the gatekeeper 130, acquires the IP address.

Step S8: When the communication connection controlling unit 3 acquires the IP address of the other facsimile 160, the IP network connecting unit 2, by using the IP address, sends out a SETUP signal (connection request signal) to the facsimile 160 through the IP network 110, the router 100 and the IP network 120.

Step S9: The facsimile 160, when receiving the SETUP signal, sends out an ARQ signal to request the gatekeeper 140 to permit the receipt of the signal and, when the gatekeeper 140 issues an ACF signal indicating the permission, sends back a CONNECT signal indicating acceptance of the connection to the facsimile 150. Thereafter, communication is carried out in accordance with the ITU-T Recommendation T. 38. After the completion of the communication of images, the facsimile 160 on the receiver side, when receiving a signal requesting for disconnection of the line from the facsimile 150 on the transmitter side, disconnect the line with the facsimile 150.

As described above, in the image communication apparatus of the first embodiment, the communication connection controlling unit 3 acting as the judging section judges whether the telephone number input by the operator is the inside or outside telephone number and, based on the judgement, the IP network connecting unit 2 accesses either of the gatekeeper 130 for the inside telephone line or the gatekeeper 140 for the outside telephone line and the communication connection controlling unit 3 acquires the IP address corresponding to the input telephone number. Therefore, regardless of whether the telephone number to be input is the inside or outside telephone number, one of image communication apparatuses acquires the IP address and, based on the acquired IP address, can transmit the image through the IP networks 110 and 120 to the other of the image communication apparatus.

Second Embodiment

In an image communication apparatus of a second embodiment, a telephone number/IP address converting table is provided which corresponds to either of the conversion table 131 stored in the gatekeeper 130 of the first embodiment or the conversion table 141 stored in the gatekeeper 140. For example, even if the gatekeeper of the second embodiment is operated to function as the gatekeeper for the outside telephone line, when the image communication apparatus of the second embodiment stores the conversion table corresponding to the conversion table 131 used in the first embodiment, the gatekeeper of the second embodiment performs the same functions as the gatekeeper of the first embodiment does. Hereinafter, a difference between the embodiment 1 and the embodiment 2 will be mainly described.

Figure 4:
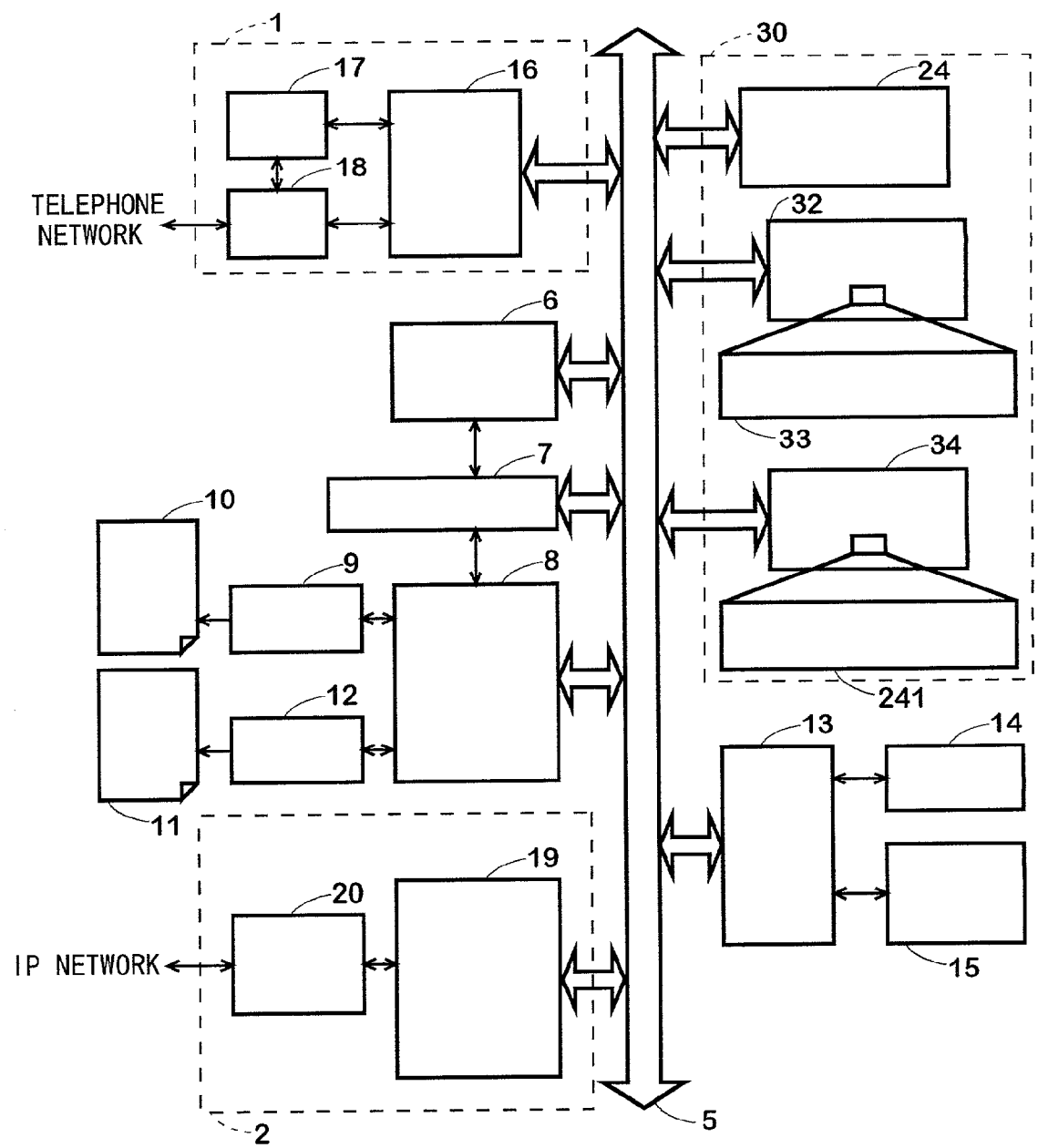
FIG. 4 is a schematic block diagram showing configurations of an image communication apparatus according to a second embodiment of the present invention.

FIG. 4 is a schematic block diagram showing configurations of the image communication apparatus according to the second embodiment. The image communication apparatus 2000 of the second embodiment includes a telephone network connecting unit 1, IP network connecting unit 2, communication connection connecting unit 30, address data bus 5, image information compressing and decompressing section 6, line memory 7, image processing section 8, printer 9, scanner 12, interface 13, mechanism controlling section 14 and operating and displaying section 15.

The communication connection controlling unit 30 has an address acquiring section 32, RAM 34 and CPU 24, which is used to connect the image communication apparatus 2000 to the other image communication apparatus by controlling the telephone network connecting unit 1 and the IP network connecting unit 2. The address acquiring section 32 stores procedures for accessing the gatekeeper adapted to manage telephone number and IP address of the other image communication apparatus and for retrieving the IP address of the other image communication apparatus, based on a telephone number of the other image communication apparatus. The address acquiring section 32 includes a telephone number/IP address conversion table controlling program 33 used to identify telephone numbers derived from different telephone systems (for example, inside and outside telephone line systems) and to manage a telephone number/IP address conversion table described later.

The RAM 34 is a writable memory storing the telephone number/IP address conversion table 241. The telephone number/IP address conversion table 241 is a conversion table to the telephone number to the IP address, which corresponds to either of the conversion table 131 and 141 described in FIG. 1 in the first embodiment.

The CPU 24 is operated to access the gatekeeper used to manage the telephone number and IP address of the other image communication apparatus and to retrieve the IP address of the image communication apparatus in accordance with the retrieving procedure stored in the address acquiring section 32 and, based on the IP address, to connect the image communication apparatus 2000 to the other image communication apparatus.

Figure 5:
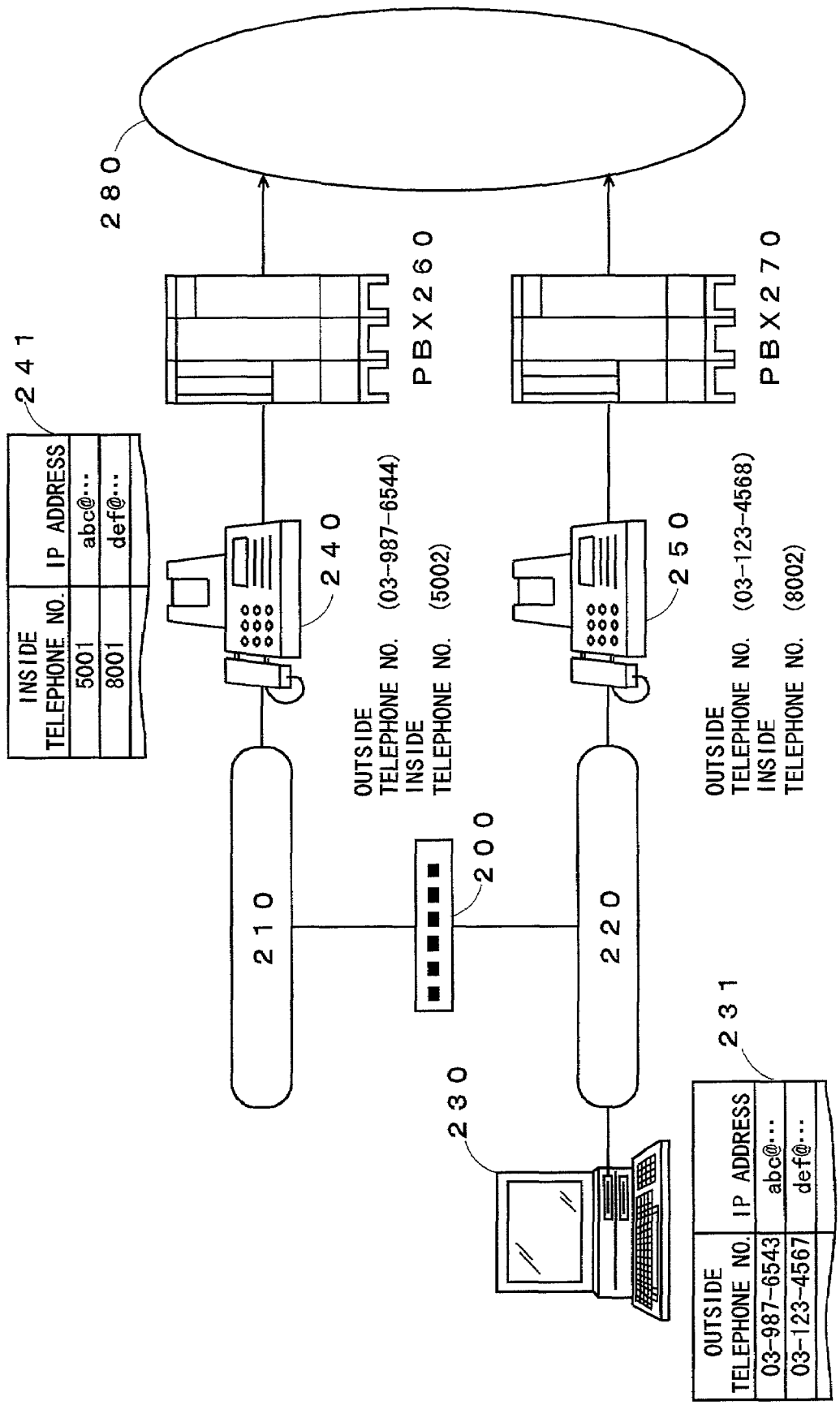
FIG. 5 is a schematic block diagram showing configurations of a network system using the image communication apparatus according to the second embodiment of the present invention.

Next, the network system made up of the image communication apparatus of the second embodiment will be described below. FIG. 5 is a schematic block diagram showing configurations of a network system using the image communication apparatus according to the second embodiment.

As shown in FIG. 5, in the image network system of the second embodiment, an IP network 210 and an IP network 220 are provided which are connected through a router 200. To the IP network 210 is connected a facsimile 240. The facsimile 240 is connected to the public network line 280 through the PBX 260. To the IP network 220 are connected a gatekeeper 230 and a facsimile 250. The facsimile 250 is connected to the public network line 280 through the PBX 270.

The facsimile 240 (for example, its outside telephone number 03-987-6544 and its inside telephone number 5002) and the facsimile 250 (for example, its outside telephone number 03-123-4568 and its inside telephone number 8002) are the image communication apparatus. The facsimile 240 is provided with a conversion table 241 for the inside telephone line, which is equivalent to the conversion table 131, so that the facsimile 240 can have the same function as the gatekeeper 130 for the inside telephone line of the first embodiment.

The gatekeeper 230, as in the case of the gatekeeper 140 of the first embodiment, receives a signal for registration of each of the outside numbers of the facsimiles 240 and 250. That is, the gatekeeper 230 stores the conversion table for the outside telephone line 231 which is equivalent to the conversion table for the outside telephone line 141 of the first embodiment.

Figure 6:
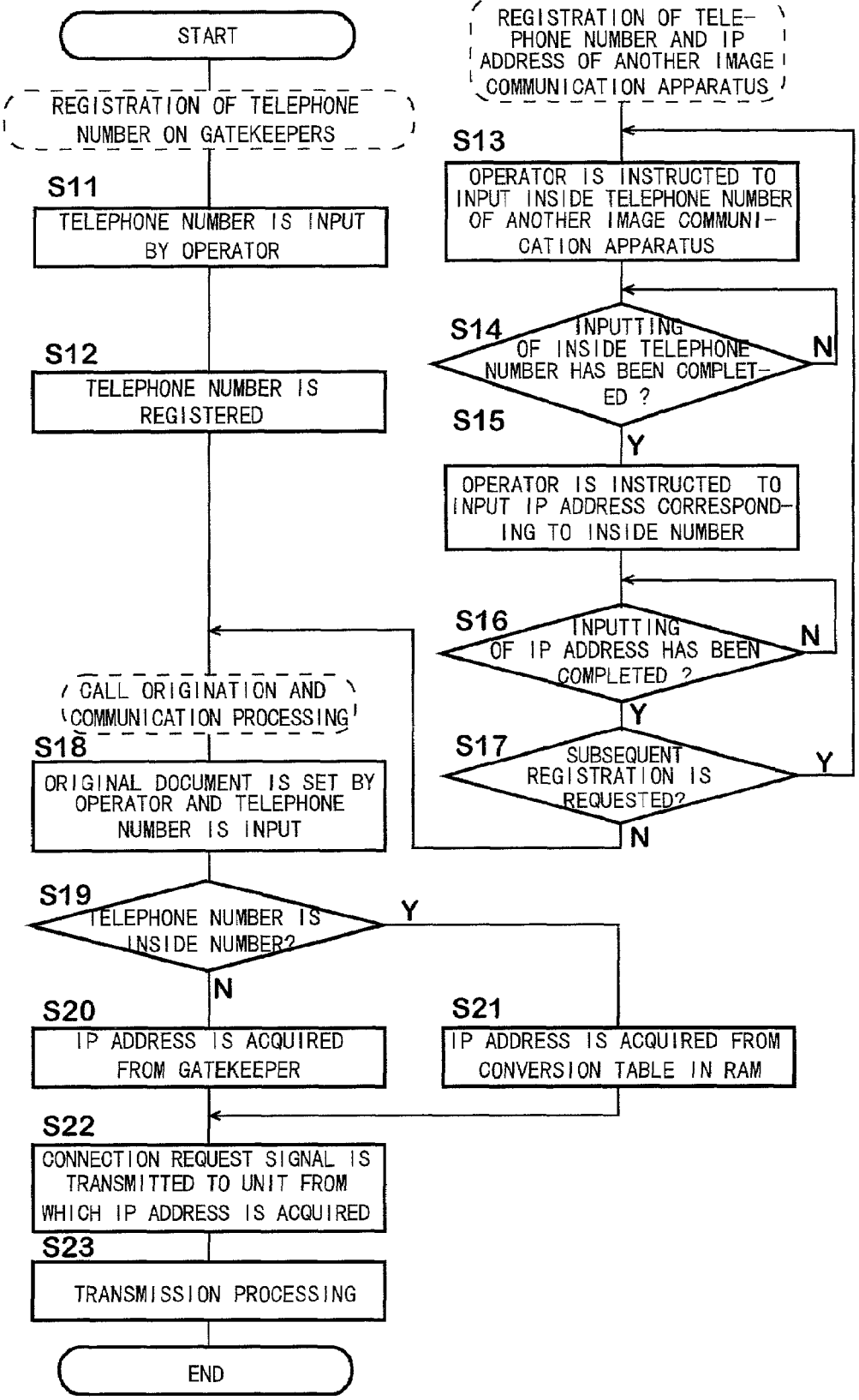
FIG. 6 is a flowchart explaining operations of the network system using the image communication apparatus according to the second embodiment of the present invention.

Next, operations of the network system made up of the image communication apparatus of the second embodiment will be described below. The difference between the image communication apparatus of the first embodiment and of the second embodiments will be explained mainly. FIG. 6 is a flowchart explaining operations of the network system using the image communication apparatus according to the second embodiment.

For easy description and understanding of the operations, let it be also assumed that an image is transmitted from the facsimile 240 to the facsimile 250.

First, the registration of the telephone number on the gatekeeper and telephone number/IP address conversion table 241 will be described.

Step S11: Telephone numbers of the facsimiles 240 and 250 are input by manipulation of the operator.

Step S12: The facsimiles 240 and 250, when judging that the input telephone number is the outside number, registers the outside telephone number on the gatekeeper 230.

Next, the registration of the inside telephone number and the IP address of the other image communication apparatus to be communicated will be described.

If the other image communication apparatus 250 has its inside telephone number, correspondence between the inside number and the IP address is stored, in accordance with the following procedures, to telephone/IP address conversion table 241 provided in the image communication apparatus 250.

Step S13: When the operator starts procedures for the registration, the image communication apparatus 240 instructs the operator to input the inside telephone number of the other image communication apparatus 250.

Step S14: The image communication apparatus 240 waits for the inputting of the inside telephone number by the operator.

Step S15: When the operator has completed the inputting of the inside telephone number, the image communication apparatus 240 continues to instruct the operator to input the IP address corresponding to the inside telephone number.

Step S16: The image communication apparatus 240 waits for the inputting of the IP address by the operator.

Step S17: The image communication apparatus 240, when having completed the inputting of the IP address by the operator, registers correspondence between the inside telephone number and the IP address on the telephone number/IP address conversion table 241. Moreover, if the registration of other combination of the inside telephone number and IP address is required, the image communication apparatus 240 returns its routine to Step S13 and performs the registration again.

The origination and communication processing will be explained.

Step S18: The operator sets a sending original document on the facsimile 240 and inputs the outside telephone number (03-123-4568) of the facsimile 250 on the receiver side.

Step S19: In the communication connection controlling unit 30, since a head of the telephone number is 0 (zero) which indicates one of the outside telephone numbers, the telephone number/IP address conversion table managing program 33 detects that the telephone number is the outside telephone number. This causes the communication connection controlling unit 30 to recognize that it should access to the gatekeeper 230 for outside telephone line.

Step S20: The communication connection controlling unit 30, as in the case of the first embodiment, accesses the gatekeeper 230 through the IP network 210, router 200 and IP network and acquires the IP address corresponding to the input outside telephone number of the facsimile 250.

Step S21: When the inside telephone number (8002) is input, in the communication connection controlling unit 30, since a head of the telephone number is 8 (eight) which indicates one of the inside telephone numbers, the telephone/IP address conversion table managing program 33 detects that the input telephone number is the inside telephone number. This causes the communication connection controlling unit 30 to recognize that it should access the embedded telephone/IP address conversion table 241. The communication connection controlling unit 30, by accessing the telephone number/IP address conversion table 241 in accordance with the above recognition, acquires the IP address corresponding to the input inside telephone number of the facsimile 250.

Step S22: When the communication connection controlling unit 30 has acquired the IP address of the other facsimile 250, the IP network connecting unit 2, by using the IP address, sends out the SETUP (connection request) signal to the facsimile 250 through the IP network 210, router 200 and IP network 220.

Step S23: The other facsimile 250, when receiving the SETUP signal, sends out an ARQ signal to request the gatekeeper 230 to permit the receipt of the signal and, when the gatekeeper 230 issues an ACF signal indicating the permission, sends back a CONNECT signal indicating acceptance of the connection to the facsimile 240. Thereafter, the communication is carried out in accordance with the ITU-T Recommendation T. 38. After the completion of the communication of images, the facsimile 250 on the receiver side, when receiving a signal requesting for disconnection of the line from the facsimile 240 on the transmitter side, disconnects the line with the facsimile 240.

As described above, in the image communication apparatus of the second embodiment, the communication connection controlling unit 30 judges whether the input telephone number is the inside telephone number or the outside telephone number and, in accordance with the judgement result, makes an inquiry about the IP address corresponding to the input outside telephone number to the gatekeeper 230 storing the table showing the correspondence between the outside telephone number and IP address or retrieves the IP address corresponding to the input inside telephone number in its image communication apparatus 240 having the telephone number/IP address conversion table 241 showing correspondence between the inside telephone number and the IP address. Therefore, as in the case of the image communication apparatus of the first embodiment, regardless of whether the input telephone number is the inside or outside telephone number, one of the image communication apparatuses acquires the IP address and, based on the acquired IP address, can transmit the image to the other of the image communication apparatus.

Third Embodiment

Figure 7:
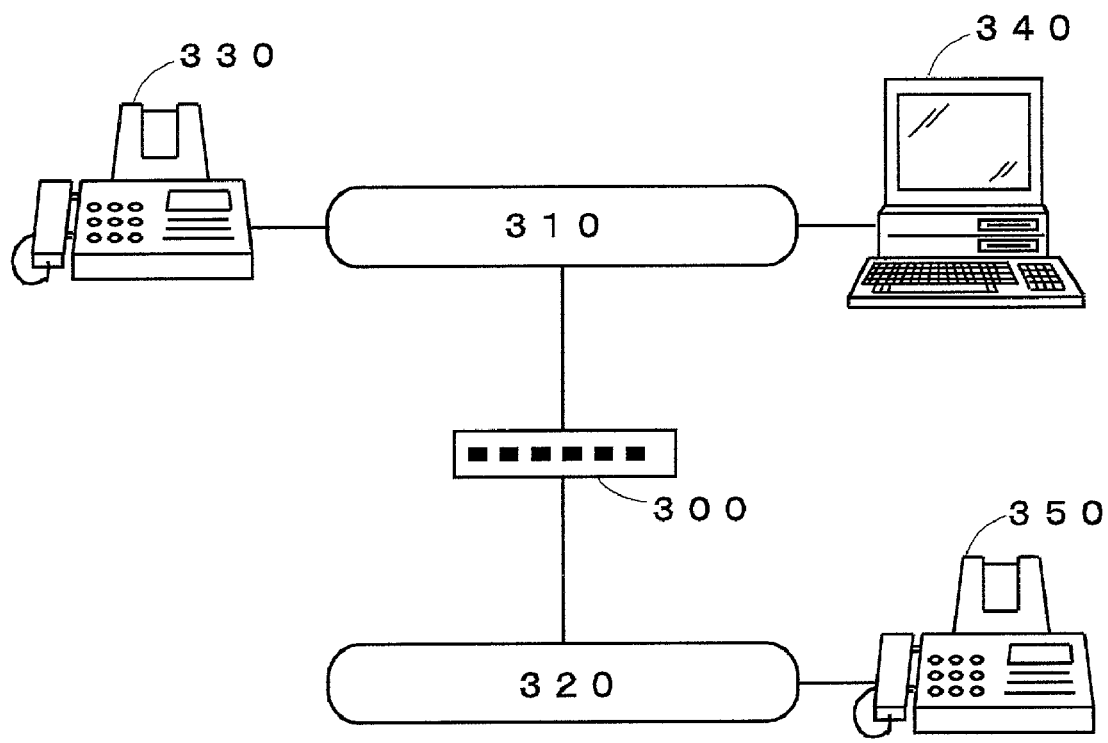
FIG. 7 is a schematic block diagram showing configurations of a network system using the image communication apparatus according to the third embodiment of the present invention.

In the image communication apparatus of the third embodiment, either of a method of referring to a conversion table within a gatekeeper or a method of referring to a table within the image communication apparatus can be selected. FIG. 7 is a schematic block diagram showing configurations of a network system using the image communication apparatus according to the third embodiment of the present invention.

As shown in FIG. 7, the network of the third embodiment is provided with an IP network 310 and an IP network, which are connected through the router 300. To the IP network 310 are connected a facsimile 330 and a gatekeeper 340. To the IP network 320 is connected a facsimile 350. Configurations of the facsimile 330 is the same as those of the facsimile 200 having the conversion table 241 as shown in FIG. 4. On the other hand, configurations of the facsimile 350 is the same as those of the facsimile 1000.

More specifically, each of the gatekeeper 340 and the facsimile 330 has a common conversion table with a same content, that is, the conversion table indicating correspondence between inside telephone numbers and IP address or correspondence between outside telephone numbers and IP addresses.

Figure 8:
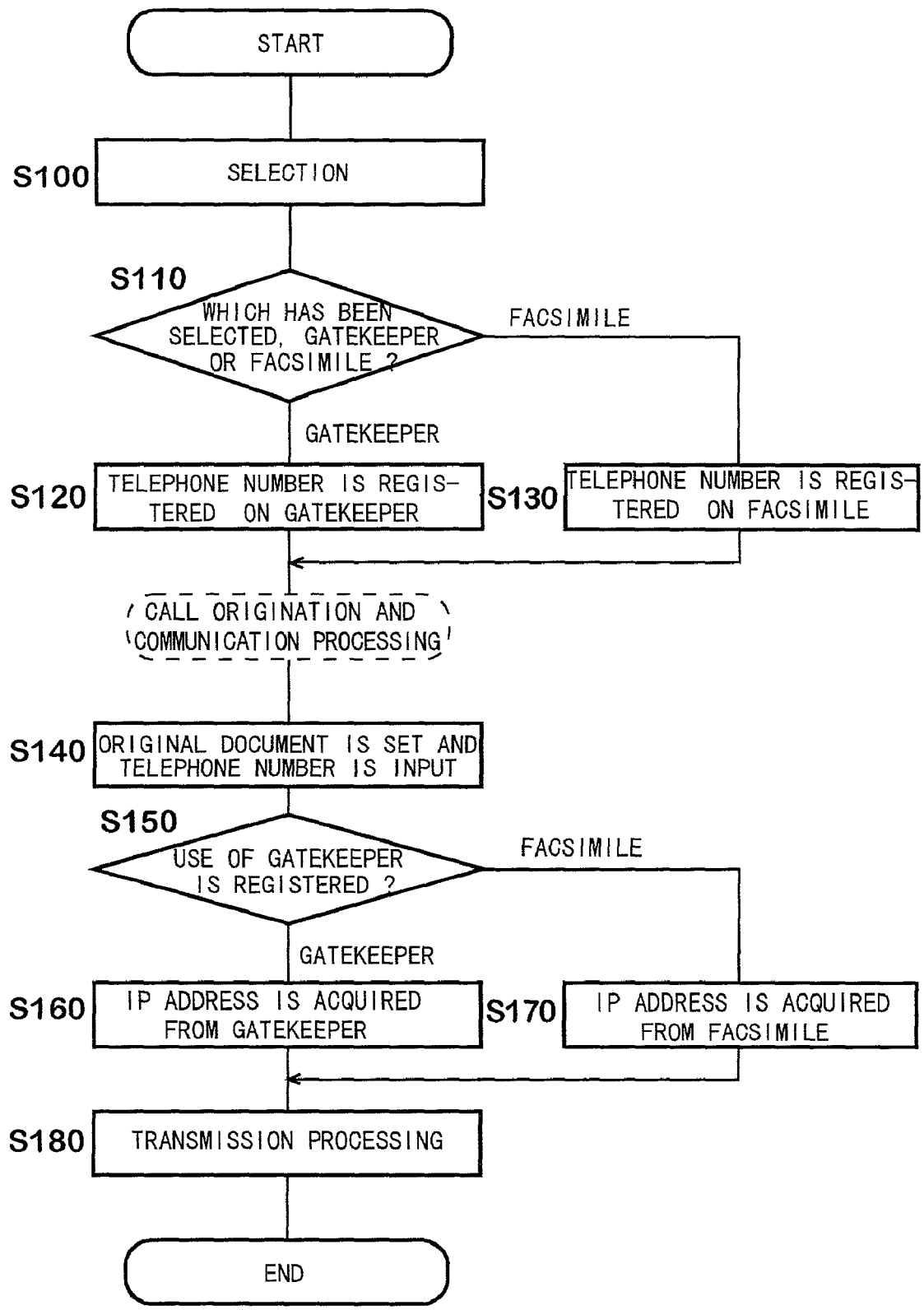
FIG. 8 is a flowchart explaining operations of the network system using the image communication apparatus according to the third embodiment of the present invention.

FIG. 8 a flowchart explaining operations of the network system using the image communication apparatus according to the third embodiment of the present invention. For easy description and understanding of the operations, let it be also assumed that an image is transmitted from the facsimile 330 to the facsimile 350.

Step S100: An operator selects either of the gateway 340 or the facsimile 330 from which an IP address is retrieved by using an operating and displaying section 15. The facsimile 330 stores the selected unit from which the IP address is to be retrieved to, for example, a RAM 23.

Step S110: The facsimile 330 judges whether the gatekeeper 340 has been selected or whether the facsimile 330 has been selected.

Step S120: When the gatekeeper 340 is judged to have been selected, the facsimile 330 registers the telephone number and the IP address of the facsimile 330 on the gatekeeper 340 in the same manner as in the first and second embodiments.

Step S130: When the facsimile 330 is judged to have been selected, the facsimile 330 requests the operator to input the telephone number and IP address of the facsimile 330 and stores the telephone number and IP address input by the operator in response to the request to the conversion table 241 within the facsimile 330.

Step S140: The operator sets the sending original document and inputs the telephone number to the other facsimile 350.

Step S150: The facsimile 330, by referring to the RAM 23, checks which has been selected, the gatekeeper 340 or the facsimile 330 as the unit from which the IP address is to be retrieved.

Step S160: When it is confirmed that the gatekeeper 340 has been selected, the facsimile 330, by accessing the gatekeeper 340 through the IP network 310, acquires the IP address corresponding to the input telephone number from the gatekeeper 340.

Step S170: When it is confirmed that the facsimile 330 has been selected as the unit from which the IP address is to be retrieved, the facsimile 330, by referring to the conversion table 241 within the facsimile 330, acquires the IP address corresponding to the input telephone number.

Step S180: When the IP address is acquired by accessing the gatekeeper 340 or retrieving it in the facsimile 330, the facsimile 330, in the same manner as in the case of the first and second embodiments, transmits images, based on the IP address, through the IP network 310, router 300 and IP network 320 and then terminates the communication.

As described above, in the image communication apparatus of the third embodiment, since the operating and displaying section 15 has a function of selecting either of the facsimile 330 or gatekeeper 340 as the unit from which the IP address is to be retrieved, it is possible to acquire the IP address in a manner to respond to various conditions including conditions as to whether the facsimile 330 has the conversion table 241 or as to whether the network system is provided with the gatekeeper 340.

Fourth Embodiment

In the image communication apparatus of a fourth embodiment of the present invention, while an image is transmitted by a facsimile to another image communication apparatus through a telephone network, an IP address of the other image communication apparatus is acquired from a signal, which is received from the other facsimile, containing the IP address of the other image communication apparatus.

Figure 9:
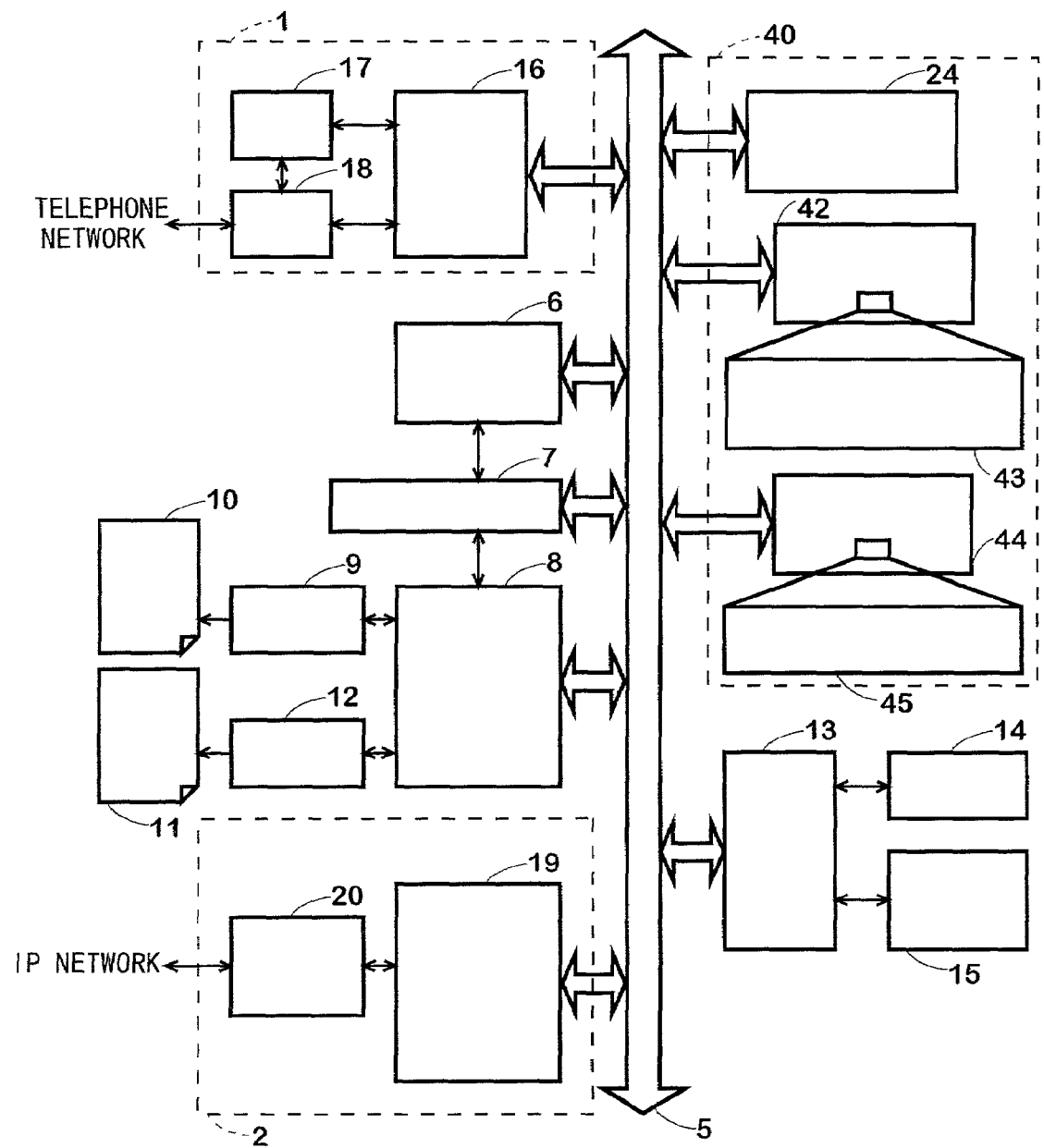
FIG. 9 is a schematic block diagram showing configurations of an image communication apparatus according to a fourth embodiment of the present invention.

FIG. 9 is a schematic block diagram showing configurations of an image communication apparatus according to the fourth embodiment. As shown in FIG. 9, the image communication apparatus 4000 of the fourth embodiment includes a telephone network connecting unit 1, IP network connecting unit 2, communication connection controlling unit 40, address data bus 5, image information compressing and decompressing section 6, line memory 7, image processing section 8, printer 9, scanner 12, interface 13, mechanism controlling section 14 and operating and displaying section 15.

The communication connection controlling unit 40 includes an address acquiring section 42, RAM 44 and CPU 24, which is used to control the telephone network connecting unit 1 and the IP network connecting unit 2 to connect the image communication apparatus 4000 to the other image communication apparatus.

The address acquiring section 42 stores procedures for accessing the gatekeeper adapted to manage the telephone number and IP address of the other image communication apparatus and for retrieving the IP address of the other image communication apparatus, based on a telephone number of the other image communication apparatus. The address acquiring section 42 includes a gatekeeper identifying section 22 to identify telephone numbers derived from different telephone systems (for example, inside and outside telephone systems) and a controlling program 43 used to acquire the IP address of the gatekeeper in accordance with the procedures for the facsimile.

The CPU 24 retrieves the IP address of the other image communication apparatus by accessing the gatekeeper used to mange the IP address and telephone number of the other image communication apparatus in accordance with the retrieving procedures stored by the address acquiring section 42 and connects the image communication apparatus 1000 to the other image communication apparatus.

The RAM 44 is provided with an IP address storing area 45 used to store the IP address of the gatekeeper obtained by the procedures for the facsimile. Configurations of the network system of the fourth embodiment are the same as those of the network system of the first embodiment shown in FIG. 2.

Figure 10:
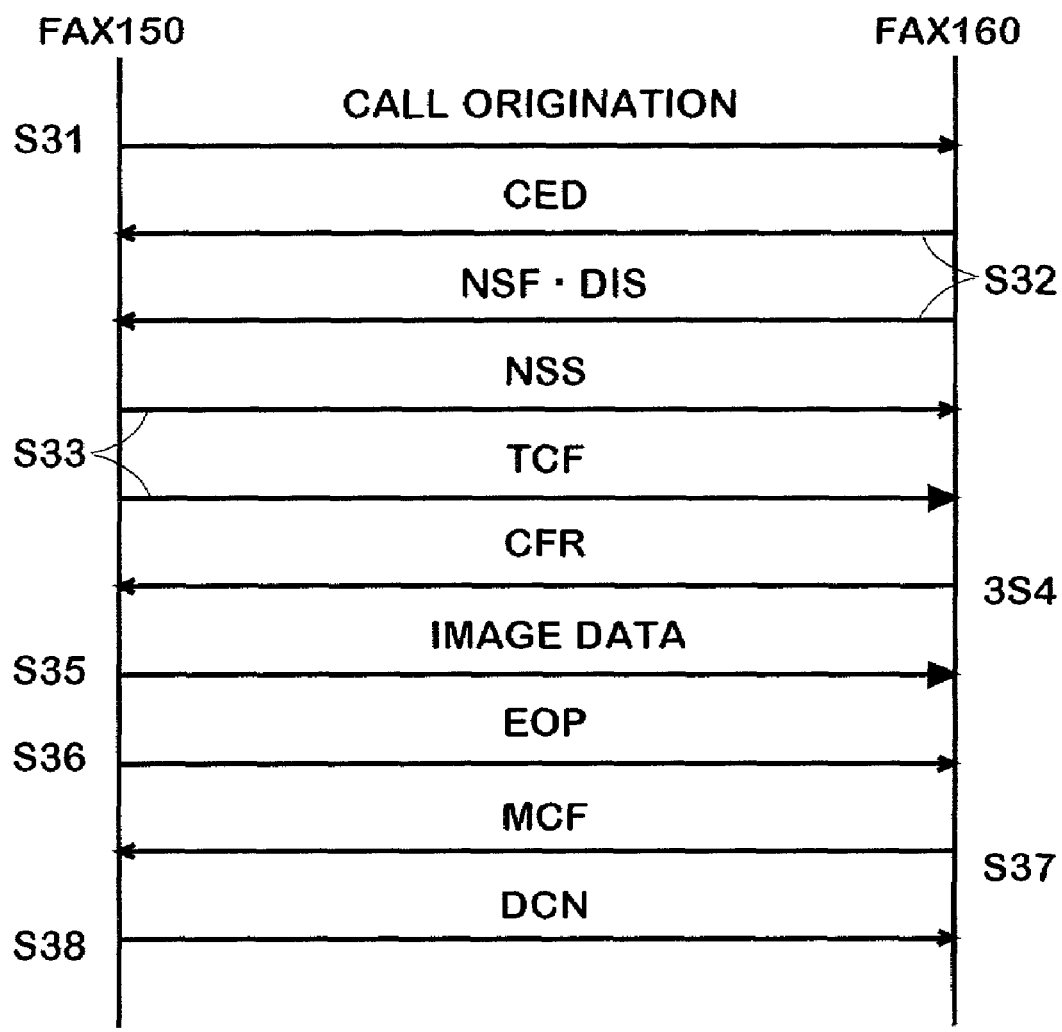
FIG. 10 is a diagram showing operations of the network system of the fourth embodiment of the present invention.

FIG. 10 is a diagram showing operations of the network system of the fourth embodiment. Operations of the facsimile 150 shown in FIG. 2 will be described in which the facsimile 150 acquires the IP address of the other facsimile 160 while the facsimile 150 is transmitting images to the other facsimile 160 shown in FIG. 2.

Operations in which the IP address of the gatekeeper is acquired will be described below.

Step S31: When the operator sets the sending original document on the facsimile 150 and inputs an outside telephone number (03-123-4567) of the facsimile 160, the facsimile 150, by making a call, attempts to be connected to the facsimile 160 through a PBX 170, public network line 190 and PBX 180.

Step S32: The other facsimile 160, in response to a ring signal for calling transmitted from the PBX 180, establishes a communication line between the both facsimiles 150 and 160. The facsimile 160, after having transmitted a CED signal (that is, a signal for identifying a called facsimile), sends out an NSF signal (that is, a non-standard function signal) and a DIS signal (that is, a digital identifying signal) to the facsimile 150 on a sender side. At this point, the facsimile 160 adds the IP address of the facsimile 160 managed by the gatekeepers 130 and 140 shown in FIG. 2 to the NSF signal.

Step S33: The facsimile 150 on the sender side reads the IP address of the other facsimile 160 on the receiver side from the NSF signal transmitted from the other facsimile 160 and stores the read IP address to the IP address storing area 45 in the facsimile 150. The facsimile 150, after having stored the IP address, sends out an NSS signal (non-standard function setting) to the facsimile 160 on the receiver side. The facsimile 150 on the sender side further sends out a TCF signal (that is, a training check) to the facsimile 160 on the receiver side.

Step S34: The facsimile 160 on the receiver side, when receiving the TCF signal from the facsimile 150 on the sender side, returns a CFR signal (that is, a receiving signal) to the facsimile 150 on the sender side.

Step S35: The facsimile 150 on the sender side, when receiving the CFR signal from the facsimile 160 on the receiver side, sends out image data.

Step S36: The facsimile 150 on the receiver side, after sending out image data, transmits an EOP signal (that is, a procedure signal) to the facsimile 160 on the receiver side.

Step S37: The facsimile 160 on the receiver side, when normally receiving image data, sends out, in response to the EOP signal, an MCF signal (that is, a message confirming signal) to the facsimile 150 on the receiver side.

Step S38: The facsimile 150 on the receiver side, after confirming the MCF signal, sends out a DCN signal (a disconnecting signal) to the other facsimile 160 to disconnect the line with the other facsimile 160.

As described above, in the image communication apparatus 160 of the fourth embodiment, while it receives images and transmits by the facsimile through the telephone network, the NSF signal having the IP address of the facsimile 160 is sent out to the facsimile 150 on the receiver side. Therefore, the facsimile 150 on the sender side, by reading the IP address of the other facsimile 160 from the NSF signal transmitted from the other facsimile 160, can obtain the IP address of the other facsimile 160. This enables the facsimile 150 on the sender side to transmit other images through the IP network based on the IP address to the other facsimile device 160.

The image communication apparatus of the fourth embodiment, in addition to being operated on the network system of the first embodiment, can be operated on the network system of the second embodiment 2 by being provided with a telephone number/IP address conversion table 241. Moreover, as described above, the IP address of the facsimile 160 on the receiver side can be notified to the facsimile 150 on the sender side by adding the IP address of the facsimile 160 on the receiver side to the NSF signal. Moreover, by adding the IP address of the facsimile 150 on the sender side to the NSS signal to be transmitted to the other facsimile 160, the IP address of the facsimile 150 on the sender side can be notified to the facsimile 160 on the receiver side.

Fifth Embodiment

Figure 11:
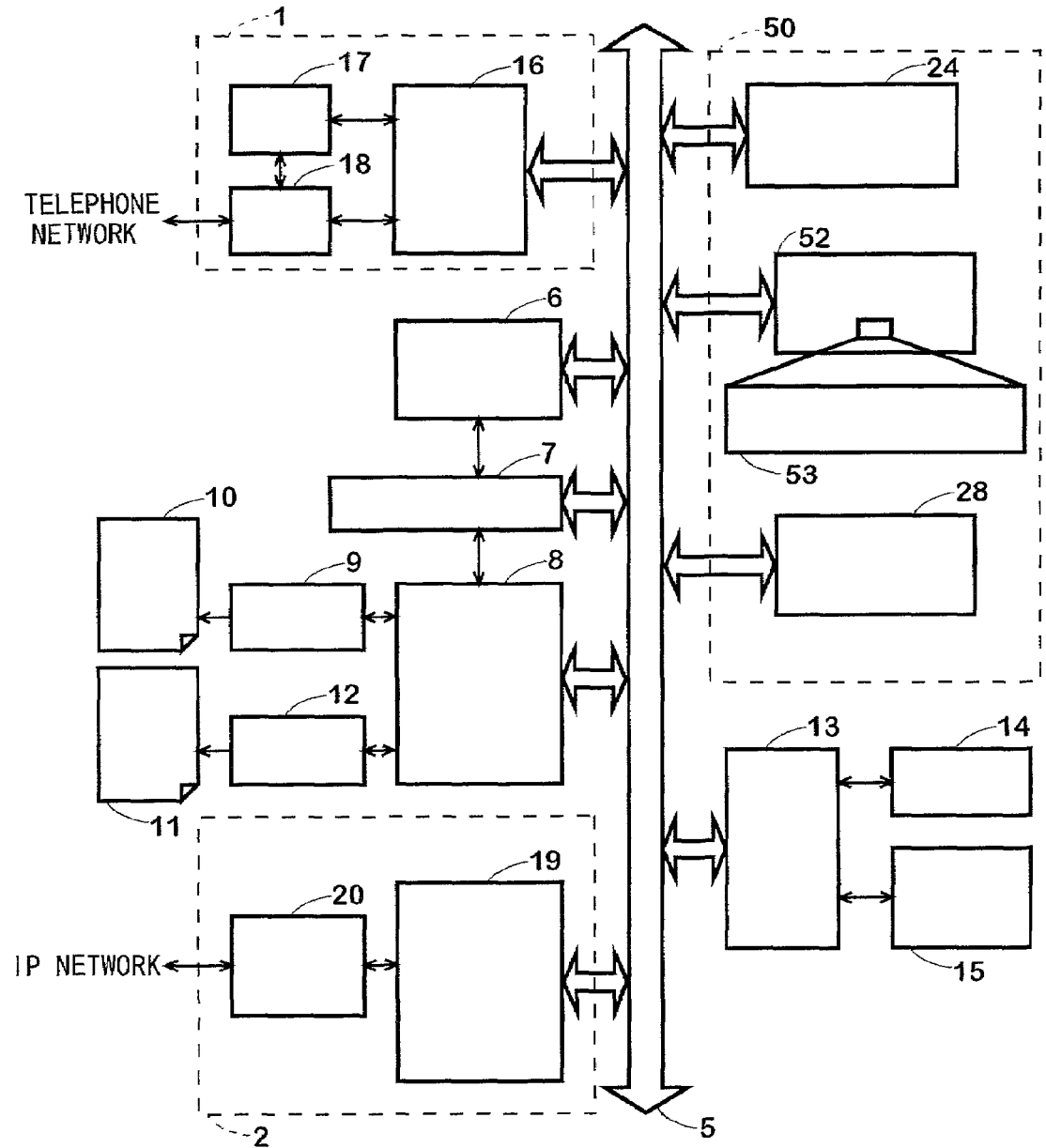
FIG. 11 is a schematic block diagram showing configurations of an image communication apparatus according to a fifth embodiment of the present invention.

In the image communication apparatus of a fifth embodiment, if images cannot be communicated through the IP network, the image is transmitted through the telephone network. FIG. 11 is a schematic block diagram showing configurations of an image communication apparatus according to a fifth embodiment of the present invention. As shown in FIG. 11, the image communication apparatus 5000 of the fifth embodiment includes a telephone network connection unit 1, IP network connection unit 2, communication connection controlling unit 50, address data bus 5, image information compressing and decompressing section 6, line memory 7, image processing section 8, printer 9, scanner 12, interface 13, mechanism controlling section 14 and operating and displaying section 15.

The communication connection controlling unit 50 is provided with an address acquiring section 52 and the CPU 24, which is used to control the telephone network connection unit 1 and the IP network connection unit 2 so as to connect the image communication apparatus 5000 to the other image communication apparatus. The address acquiring section 52 stores retrieving procedures to retrieve the IP address of the other image communication apparatus, by accessing the gatekeeper used to manage IP addresses and telephone numbers of the other image communication apparatus, based on telephone numbers of the other image communication apparatus. The address acquiring section 52 includes an alternative method 53 which is a program used to switch to the telephone network containing an inside telephone network and outside telephone network when the IP network cannot be used for line connections. Configurations of the network system of the fifth embodiment made up of the image communication apparatus are the same as those of the network system of the first embodiment shown in FIG. 2.

FIG. 12 is a flowchart explaining operations of the network system using the image communication apparatus according to the fifth embodiment. For easy description and understanding of operations, let it be also assumed that an image is transmitted from the facsimile 150 shown in FIG. 2 to the facsimile 160 in FIG. 2.

Step S41: The operator sets the sending original document on the facsimile 150 and inputs an outside telephone number (03-123-4567) of the other facsimile 160.

Step S42: In the communication connection controlling unit 50 in the facsimile 150, the gatekeeper section 22 judges whether the input telephone number is either of the inside telephone number or the outside telephone number.

Step S43: Since the head of the input telephone number is 0 (zero) which indicates one of the outside telephone numbers, the gatekeeper identifying section 22 judges that the telephone number is the inside telephone number. This causes the communication connection controlling unit 50 to recognize the necessity of access to the gatekeeper 140. The communication connection controlling unit 3 accesses the gatekeeper 140 for the outside telephone line to acquire the IP address of the facsimile 160.

Step S44: When the inside telephone number (8001) is input, since the head of the input telephone number is 8 (eight) which indicates one of the inside telephone numbers, the gatekeeper identifying section 22 judges that the telephone number is the inside telephone number. This causes the communication connection controlling unit 50 to recognize the necessity of access to the gatekeeper 130. The communication connection controlling unit 50 accesses the gatekeeper 130 for the inside telephone line to acquire the IP address of the facsimile 160.

Step S45: The facsimile 150 on the sender side checks whether the IP address of the other facsimile could have been obtained.

Step S46: When the IP address of the other facsimile 160 could have been acquired, the facsimile 150 makes a call using the acquired IP address. More particularly, the facsimile 150, based on the IP address, sends out a connection requesting signal (SETUP) to the other facsimile 160. The other facsimile 160 receives the SETUP signal and requests the gatekeeper 140 to receive a signal. The facsimile 160, when receiving a permission from the gatekeeper 140, returns a connection acceptance signal (CONNECT) back to the facsimile 150 on the sender side.

Step S47: Both facsimiles 150 and 160 performs communication processing.

Step S48: The facsimile 150 judges whether the communication has normally terminated.

Step S49: The facsimile 150, when judging that the communication has not normally terminated, judges whether the abnormality is attributable to the IP networks 110 and 120.

Step S50: The facsimile 150, when judging that the abnormal termination is not attributable to the IP networks 110 and 120, terminates communications.

Step S51: When the abnormal termination is judged to be attributable to the IP networks 110 or 120, the communication connection controlling unit 50 of the facsimile 150, in accordance with the alternative method, makes an attempt to carry out the communication through the telephone network, that is, PBX network or public network line.

Step S52: The facsimile 150 judges that the communication through the telephone network has terminated normally. The facsimile 150, when judging that the communication through the telephone network has not terminated normally, handles communication errors.

As described above, in the image communication apparatus of the fifth embodiment, when it is judged that the transmission of images through the IP network is made impossible, images that could not be transmitted can be transmitted through other telephone network lines including the public network line or private network line. Therefore, even if images could not be transmitted through the IP network, it is surely made possible to transmit images through the telephone network.

Sixth Embodiment

In an image communication apparatus of a sixth embodiment, as in the case of the fifth embodiment, when images cannot be transmitted through the IP network, transmission of the images is made possible by using the telephone network. Since configurations of the image communication apparatus and a network system of the sixth embodiment are the same as in the case of the first and second embodiment, descriptions of them are omitted.

FIG. 13 is a flowchart explaining operations of the network system using the image communication apparatus according to the sixth embodiment.

For easy description and understanding of operations of the network system, let it be assumed that images are transmitted from the facsimile 150 shown in FIG. 2 in the first embodiment to the facsimile 160, that the selection of a telephone button "#" represents an access to the gatekeeper, that is, the transmission of images through the IP network and that designation of "OR" represents an attempt of transmitting through the telephone network following the transmission of images through the IP network.

Step S200: An operator sets a sending original document and inputs a telephone number of the other facsimile 160.

Step S210: The facsimile 150 judges whether a head of the input telephone number is the mark "#".

Step S220: The facsimile 150, when judging that the head of the telephone number is the mark "#", accesses the gatekeeper 130 or 140, as in the case of the first embodiment.

Step S230: The facsimile 150 judges whether the IP address corresponding to the input telephone number could be acquired or not.

Step S240: When the IP address has been acquired, as in the case of the first and second embodiments, images are transmitted to the other facsimile 160, based on the IP address.

Step S250: The facsimile 150 judges whether the image transmission has been normally terminated or not.

Step S260: When the head of the telephone number is judged to be not the mark "#" in Step S200, the facsimile 150 judges whether the "OR" has been set on the facsimile 150 or not.

Step S270: The facsimile 150, if it has failed to acquire the IP address in Step S230 or if it has failed to transmit images by using the IP address in Step S250, judges whether the "OR" processing has been designated as in the case of Step S260 or not.

Step S280: The facsimile 150, when judging that the "OR" processing has been designated, transmits the image to the other facsimile 160 through the telephone network. More particularly, the facsimile 150, when judging that the input telephone number is an outside telephone number, transmits images to the other facsimile 160 through the PBX 170, public network line 190 and PBX 180, while, the facsimile 150, when judging that the input telephone number is an inside telephone number, transmits images to the other facsimile 160 through the PBX 170 and PBX 180.

Step S290: The facsimile 150 judges whether the transmission of images through the telephone network has been normally terminated or not.

Step S300: The facsimile 150, when judging that the "OR" processing has not been designated in Step S240 or that it has failed to transmit images through the telephone network in Step S290, handles communication errors.

As described above, in the image communication apparatus of the sixth embodiment, the operating and displaying section 15 functions so that, by the input of the mark "#", priority is given to the transmission of images through the IP network rather than to the transmission through the telephone network. This enables transmission costs to be reduced if, for example, the transmission cost through the IP network is lower than that through the telephone network. Moreover, for example, when the IP networks 110 and 120 are not in a good communication state or when operations of the gatekeepers 130 and 140 are abnormal, by not inputting the mark "#", procedures for immediately transmitting through the telephone network without making an attempt to transmit images through the IP network can be set, thus enabling avoidance of wasteful attempts for communication through the IP network.

It is apparent that the present invention is not limited to the above embodiments but may be changed and modified without departing from the scope and spirit of the invention.

What is claimed is:

1. An image communication system comprising:
a plurality of image communications apparatuses, each of which possessing a telephone number belonging to a first category of telephone numbers, a telephone number belonging to a second category of telephone numbers and a corresponding network address;

a first address supplying device storing telephone numbers belonging to the first category of telephone numbers and not the second category of telephone numbers, the corresponding network address of each one of the plurality of image communications apparatuses and a relationship between each one the telephone numbers belonging to the first category of telephone numbers and each one of the corresponding network addresses;

a second address supplying device storing telephone numbers belonging to the second category of telephone numbers and not the first category of telephone numbers, the corresponding network address of each one of the plurality of image communications apparatuses and a relationship between each one of the telephone numbers belonging to the second category of telephone numbers and each one of the corresponding network addresses; and a judging section included in each of the plurality image communications apparatuses, said judging section included in one of the plurality of image communications apparatuses: (1) determining whether a telephone number input to the one of the plurality of image communications apparatuses belongs to the first category of telephone numbers or to the second category of telephone numbers, and (2) if the input telephone number belongs to the first category of telephone numbers, directing the input telephone number to the first address supplying device and (3) if the input telephone number belongs to the second category of telephone numbers, directing the input telephone number to the second address supplying device, wherein said first address supplying device provides the corresponding network address of the input telephone number to the one of the plurality of image communication apparatuses if the input telephone number belongs to the first category of telephone numbers, and said second address supplying device providing the corresponding network address of the input telephone number to the one of the plurality of image communication apparatuses if the input telephone number belongs to the second category of telephone numbers, and wherein said first address supplying device and said second address supplying device are separated by a computer network.

2. The image communication system of claim 1, wherein each of the plurality of image communications apparatuses, the first address supplying device and the second address supplying device are operably connected together by a computer network.

3. The image communications system of claim 1, wherein each of the plurality of image communications apparatuses are connected to an outside telephone network and possess an outside telephone number for communication therethrough.

4. The image communications system of claim 1, wherein each of the plurality of image communications apparatuses are connected to an inside telephone network and possess an inside telephone number for communication therethrough.

5. The image communications system of claim 1, wherein the function of at least one of the first address supplying device and the second address supplying device is incorporated in at least one of the plurality of image communications apparatuses.

6. The image communications system of claim 1, wherein the first category of telephone numbers corresponds to outside telephone numbers and the second category of telephone numbers corresponds to inside telephone numbers.

7. A method of transmitting images between a plurality of image communications apparatuses, each of the plurality of image communications apparatuses possessing a telephone number belonging to a first category of telephone numbers, a telephone number belonging to a second category of telephone numbers and a corresponding network address, the method comprising the steps of:

receiving in a first one of the plurality communication apparatuses a telephone number of a second one of the plurality of image communication apparatuses;

judging within said first one of the communication apparatuses whether said received telephone number corresponds to the first category of telephone numbers or to the second category of telephone numbers;

attempting to acquire the network address corresponding to the telephone number of the second one of the image communication apparatuses if said telephone number is determined to belong to the first category of telephone numbers by referring to a first table storing the first category of telephone numbers and not the second category of telephone numbers, the corresponding network address of each one of the plurality of image communications apparatuses and a relationship between each one of the telephone numbers belonging to the first category of telephone numbers and each one of the corresponding network addresses;

attempting to acquire the network address corresponding to the telephone number of the second one of the image communication apparatuses if said telephone number is determined to belong to the second category of telephone numbers by referring to a second table storing the second category of telephone numbers and not the first category of telephone numbers, the corresponding network address of each one of the plurality of image communications apparatuses and a relationship between each one of the telephone numbers belonging to the second category of telephone numbers and each one of the corresponding network addresses; and transmitting said image to said second image communication apparatus via the computer network based on the acquired network address if the network address is acquired, wherein the first table and the second table are separated by a computer network.

8. The image communication method according to claim 7, further comprising the step of:

transmitting said image from said first image communication apparatus to said second image communication apparatus through one of a first telephone network and a second telephone network if said network address is not acquired.

9. An image communication system for performing an image communication via an Internet Protocol (IP) network, comprising:

a first image communication apparatus for transmitting an image;

a second image communication apparatus which is used for receiving said image, and is assigned an outside telephone number used in an outside telephone line communication system, an inside telephone number used in an inside telephone line communication system and an IP address for said image communication via said IP network;

a first address supplying device which stores the outside telephone number and not the inside telephone number and stores a corresponding relation between said outside telephone number and said IP address; and a second address supplying device stores the inside telephone number and not the outside telephone number and stores a corresponding relation between said inside telephone number and said same IP address, wherein said first image communication apparatus includes:

an inputting section to input a number for transmitting an image to said second image communication apparatus;

a judging section to judge said inputted number is which of said outside telephone number and said inside telephone number of said second image communication apparatus;

an IP address obtaining section which, if said inputted number is said outside telephone number, connects to said first address supplying device via said IP network to obtain said IP address based on said outside telephone number; and which, if said inputted number is said inside telephone number, connects to said second address supplying device via said IP network to obtain said IP address based on said inside telephone number; and an image transmitting section which, on the basis of said obtained IP address, transmits said image to said second image communication apparatus via said IP network, wherein said first address supplying device and said second address supplying apparatus are connected by said IP network.

10. An image communication apparatus for an image communication network system which includes a computer network enabled to transmit and receive an image on the basis of a network address; a first category telephone line enabled to transmit and receive said image on the basis of a first category telephone number; a second category telephone line enabled to transmit and receive said image on the basis of a second category telephone number; a first address supplying device which is connected with said computer network, and which stores said first category telephone number and not said second category of telephone number and stores said network address corresponding to said first category telephone number through a first setting a relation and a second address supplying device which is connected separately from said first address supplying device with said computer network, and which stores said second category telephone number and not the said first category of telephone number and stores said network address corresponding to said second category telephone number through a second setting a relation, said apparatus comprising:

an inputting section into which a number corresponding to one of said first category telephone number and said second category telephone number that are assigned to another image communication apparatus to receiving said image is input;

a judging section to judge whether the input number inputted into said inputting section belongs to said first category telephone number or to said second category telephone number;

a number transmitting section which, if said input number is judged being said first category telephone number by said judging section, transmits said input number to said first address supplying device; and if said input number is judged to be said second category telephone number by said judging section, transmits said input number to said second address supplying device;

an address receiving section to receive said network address supplied from one of said first address supplying device and said second address supplying device in response to said input number transmitted from said number transmitting section; and an image transmitting section to transmit said image to said another image communication apparatus via said computer network by making said network address received by said address receiving section serve as a transmitting address.

11. The image communication apparatus according to claim 10, wherein said image communication apparatus is provided with said first address supplying device and said second address supplying device as function sections of said image communication apparatus.

12. The image communication apparatus according to claim 11, further comprising a second image transmitting section to transmit images to said another image communication apparatus through one of said first telephone network for use with said first telephone number and through said second telephone network for use with second telephone number.

13. The image communication apparatus according to claim 12, further comprising a signal receiving section to receive, when said second image transmitting section transmits a first image, using either of said first telephone number or said second telephone number, to said another image communication apparatus through either of said telephone network for use in said first telephone number or said telephone network for use in second telephone number, a signal containing a computer address provided to said image communication apparatus on a receiver side which is returned, in response to said transmitting of said image, from said another image communication apparatus and wherein said first image transmitting section is adapted to transmit a second image contained in said signal received by said signal receiving section, based on said computer address of said another image communication apparatus, to said another image communication apparatus through said computer network.

14. The image communication apparatus according to claim 13, further comprising a storage section to store correspondence between said telephone number used by said image transmitting section when said first image is transmitted and received through either of said telephone network for use in said first telephone number or said telephone network for use in said second telephone number and said network address of said another image communication apparatus received by said signal receiving section when said first image is received.

15. The image communication apparatus according to claim 12, wherein said second image transmitting section, when said first image transmitting section fails to transmit said image based on said computer address through said computer network, transmits said image using either of said first telephone number or said second telephone number through either of said telephone network for use in said first telephone number or said telephone network for use in said second telephone number.

16. The image communication apparatus according to claim 12, further comprising an operation section to designate to whether priority is given to transmission by said first image transmitting section through said computer network or to transmission by said second image transmitting section through said telephone network.

17. The image communication apparatus according to claim 16, wherein said operation section, when said first image transmitting section fails to transmit said image through said computer network, designates whether said image is to be transmitted by said second image transmitting section through said telephone network.

18. The image communication apparatus according to 10, wherein
said first category telephone line is a telephone line corresponding to a first telephone network; and
said second category telephone line is a telephone line corresponding to a second telephone network.

19. The image communication apparatus of claim 18, wherein said first telephone network corresponds to an inside telephone network and said second telephone network corresponds to an outside telephone network.

20. The image communication apparatus according to claim 10, wherein said first telephone network is an inside telephone network that is able to transmit and receive said image based on said first telephone number being said inside telephone number and said second telephone network is an outside telephone network that is able to transmit and receive said image based on said second telephone number being said outside telephone number and wherein said computer network is either of an intranet or the Internet that is able to transmit and receive said image based on said network address being an IP address.

21. The image communication apparatus according to claim 10, wherein said number transmitting section transmits said input number through said computer network and said address receiving section receives said network address through said computer network.

* * * * *